(12) United States Patent
Khan et al.

(10) Patent No.: US 12,418,427 B2
(45) Date of Patent: Sep. 16, 2025

(54) SYSTEMS AND METHODS FOR DYNAMIC ASSET TOKENS ON A DISTRIBUTED LEDGER

(71) Applicant: Verizon Patent and Licensing Inc., Basking Ridge, NJ (US)

(72) Inventors: Ahmed A. Khan, Plano, TX (US); Mohammed Alsadi, Redmond, WA (US); Nityanand Sharma, Tampa, FL (US); Sammy Alnajar, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 234 days.

(21) Appl. No.: 18/321,118

(22) Filed: May 22, 2023

(65) Prior Publication Data

US 2024/0396752 A1 Nov. 28, 2024

(51) Int. Cl.
*H04L 9/00* (2022.01)
*G06F 16/22* (2019.01)

(52) U.S. Cl.
CPC ............ *H04L 9/50* (2022.05); *G06F 16/2228* (2019.01); *H04L 2209/56* (2013.01)

(58) Field of Classification Search
CPC ..... H04L 9/50; H04L 2209/56; H04L 9/3239; G06F 16/2228
See application file for complete search history.

(56) References Cited

U.S. PATENT DOCUMENTS

| | | | | |
|---|---|---|---|---|
| 10,121,019 | B2 * | 11/2018 | Struttmann | ............ H04L 9/0618 |
| 11,777,953 | B2 * | 10/2023 | Oberhauser | ............. H04L 63/08 |
| | | | | 726/30 |
| 2022/0147983 | A1 * | 5/2022 | Marsh | ................... G06Q 20/389 |
| 2023/0186353 | A1 * | 6/2023 | Wadley | .............. G06Q 30/0278 |
| | | | | 705/306 |

\* cited by examiner

*Primary Examiner* — Sm A Rahman

(57) ABSTRACT

A system described herein may maintain a distributed ledger that includes records, such as Non-Fungible Tokens ("NFTs"), which may represent assets dynamic attributes. The system may record a first record, associated with a given asset, to a distributed ledger. The first record may include an identifier, such as an identifier associated with the asset. The system may receive a request to update the attributes of the asset, where the request may include the identifier. The request may include a hash of the previously recorded attributes of the asset, where such attributes may be maintained by an off-chain repository. The system may compare a hash of the attributes, as included in the first record, to the hash included in the request, and may authorize the recordation of a second record to the distributed ledger, including the updated attributes, when the hashes match.

20 Claims, 21 Drawing Sheets

1201

| Asset ID | Asset attribs. | Reference | Previous attribute ref. | Previous attribute hash |
|---|---|---|---|---|
| Asset_A | {Attribs_1} | URI_A | -- | -- |
| Asset_A | {Attribs_1}, {Attribs_2} | URI_B | URI_A | {Hash_Attribs_1} |
| Asset_A | {Attribs_3} | URI_C | URI_B | {Hash_Attribs_2} |
| Asset_A | {Attribs_3}, {Attribs_4} | URI_D | URI_C | {Hash_Attribs_3} |
| Asset_A | {Attribs_5} | URI_E | URI_D | {Hash_Attribs_4} |

Off-chain repository 303

FIG. 12A

SYSTEMS AND METHODS FOR DYNAMIC ASSET TOKENS ON A DISTRIBUTED LEDGER

BACKGROUND

Distributed ledgers, such as blockchains, provide for the decentralized and secure storage of data. Distributed ledgers may further provide for the immutability of recorded data, as data may not be altered once recorded to a distributed ledger. The data recorded to distributed ledgers may include tokens that represent tangible or digital assets, such as vehicles, real property, digital art, etc.

BRIEF DESCRIPTION OF THE DRAWINGS

FIGS. 12A-12D illustrate examples of information that may be maintained by an off-chain repository after multiple modifications to the attributes of a given asset, in accordance with some embodiments;

DETAILED DESCRIPTION OF EXAMPLE EMBODIMENTS

Figure 1:
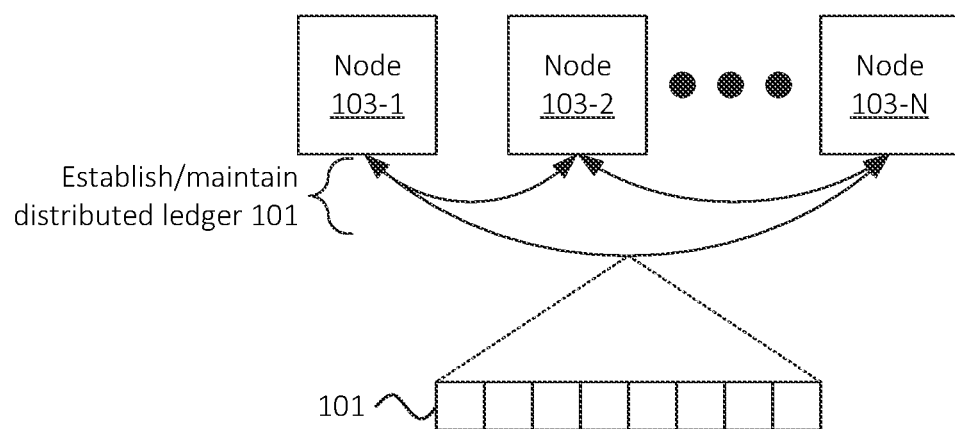
FIGS. 1, 2A, and 2B illustrate concepts associated with distributed ledgers.

The following detailed description refers to the accompanying drawings. The same reference numbers in different drawings may identify the same or similar elements.

Distributed ledgers, such as blockchains, may provide for a decentralized, immutable mechanism by which data may be recorded and/or retrieved, such as information pertaining to tokens, coins, assets, etc. An example token may include a non-fungible token ("NFTs), which may be used to represent, refer to, link to, or otherwise denote an association with an asset, object, etc. (referred to herein simply as "asset" for the sake of brevity). For example, a particular NFT may be associated with (e.g., may be a tokenized representation of) a tangible asset, such as a vehicle, real property, a collectible item, etc. As another example, an NFT may be associated with a digital asset, such as one or more image files, one or more video files, a digital asset repository, or the like. Different NFTs may be associated with different unique identifiers to distinctly identify particular NFTs from each other.

NFTs (e.g., as recorded to one or more distributed ledgers 101) may further be associated with attributes, metadata, etc., such as attributes of an asset represented by a given NFT, a Uniform Resource Locator ("URL") or other link to one or more resources that include attribute information for the asset, or the like. In an example where a particular NFT represents a vehicle, asset attributes (e.g., as indicated by the NFT) may include a make, model, color, year, service history, or other attributes of the vehicle. Additionally, or alternatively, the asset attributes may include a URL or other type of reference to a network-accessible resource (e.g., a webpage, an online spreadsheet, etc.) that includes such attributes of the vehicle. As yet another example, the asset attributes may include an image of the vehicle, and/or a URL or other type of reference to an image of the vehicle.

As distributed ledgers are immutable, the presence of an NFT on a given distributed ledger may serve as an immutable, verifiable record of ownership of the NFT as well as attributes of the NFT at time of creation of the NFT. Situations may occur in which an underlying asset that is represented by an NFT is modified, but such modifications may not necessarily be reflected by the NFT. For example, a vehicle that is represented by a particular NFT may be repainted a different color, or may have additional services performed (e.g., an oil change, a tire rotation, a repair, etc.), or may undergo other changes as compared to its attributes or state when the NFT was created. Embodiments described herein provide for dynamic asset tokens (e.g., dynamic NFTs) that may reflect modifications to assets represented by such asset tokens. In this manner, distributed ledgers may be used not only to record asset tokens that reflect assets with a state or attributes at time of token creation, but may be used to verifiably record changes to such asset tokens as they occur, thus enhancing the utility of such asset tokens.

As shown in FIG. 1, distributed ledger 101 may be established and/or maintained by one or more nodes 103 (e.g., nodes 103-1 through 103-N). Nodes 103 may also maintain a "world state" associated with distributed ledger 101. For example, distributed ledger 101 may include values associated with particular variables, attributes, etc. Since distributed ledger 101 is immutable, multiple versions of the same attribute may be present in distributed ledger 101. The world state associated with distributed ledger 101 may include the most up-to-date version (or versions) of one or more of such attributes. Nodes 103 may access the world state when receiving interactions, instructions, etc. to access or modify values that have been previously recorded to distributed ledger 101. As discussed below, nodes 103 may be implemented in a containerized environment, in which various containers, cloud systems, and/or other virtualized environments implement one or more nodes 103.

Figure 2A:
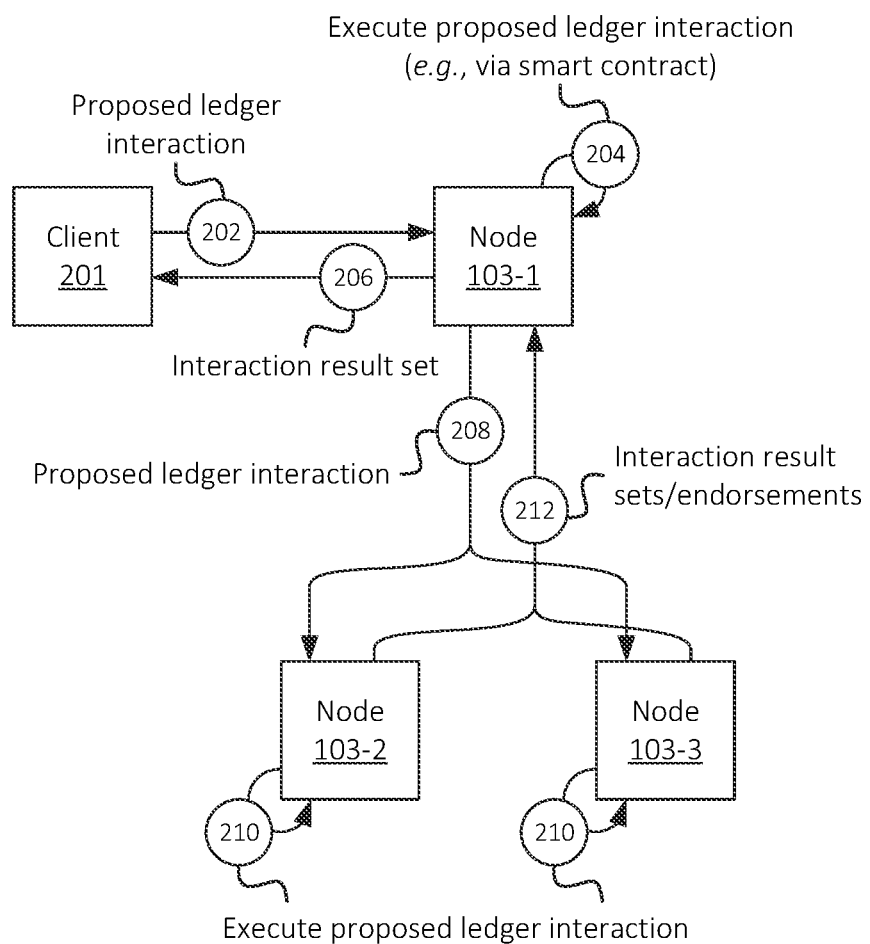
Figure 2B:
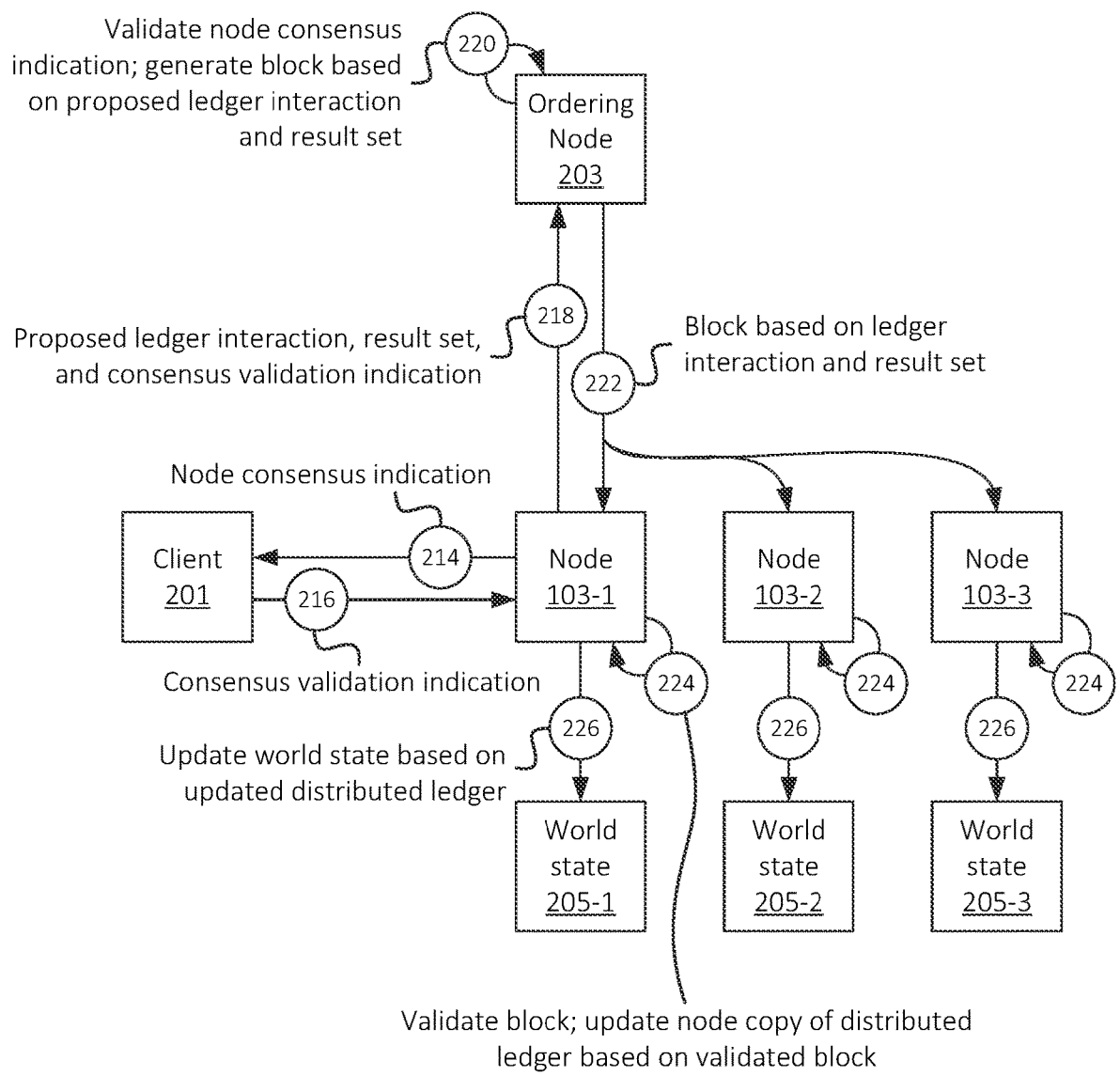

FIGS. 2A and 2B illustrate an example of modifying distributed ledger 101 and/or world state information based on an interaction with distributed ledger 101. As shown, a particular node 103-1 may receive (at 202) a proposed ledger interaction (e.g., a request to access or record information to distributed ledger 101) from a particular source, such as client 201 (e.g., which may be or may be implemented by a device or system that has access to node 103-1, such as a device or system that has authentication credentials, locator information, etc. via which client 201 is able to interact with node 103-1). In some embodiments, node 103-1 may receive the proposed ledger interaction from a distributed ledger management system (e.g., which may receive the proposed ledger interaction from client 201 and may select node 103-1 out of a group of nodes 103, such as a group of nodes associated with the same channel in a channel-based ledger system, such as the Hyperledger® Fabric), an ordering node, or other suitable device or system.

Client 201 may be, for example, an entity associated with distributed ledger 101 (e.g., may be associated with an address, a "wallet," a decentralized application ("dApp"), etc.). In this example, assume that client 201 is authorized to initiate, request, etc. the proposed ledger interaction, which may include the modification of one or more values of one or more attributes that are currently associated with distributed ledger 101, the addition of one or more attributes to distributed ledger 101, or other suitable interactions. In other examples, node 103-1 and/or some other device or system may verify that client 201 is authorized to initiate the proposed ledger interaction. The proposed ledger interactions may be specified in one or more smart contracts, as specified by access parameters associated with distributed ledger 101.

In some embodiments, the proposed ledger interaction (received at 202) may indicate a smart contract recorded to distributed ledger 101, which may specify one or more inputs (e.g., types of inputs, quantity of inputs, and/or other input parameters), and may also include actions to take with respect to the inputs in order to generate one or more outputs (sometimes referred to as "chaincode"). For example, the proposed ledger interaction may specify a particular smart contract (e.g., an address associated with distributed ledger 101 with which the smart contract is associated) and one or more input values according to input parameters specified by the particular smart contract. In some examples, the proposed ledger interaction may refer to one or more values that have previously been recorded to distributed ledger 101 (and thus reflected in world state information associated with distributed ledger 101), such as an interaction that increments or decrements previously recorded values or performs other computations based on previously recorded values.

Node 103-1 may execute (at 204) the proposed ledger interaction, which may include accessing the one or more values that were previously recorded to distributed ledger 101. In order to determine the one or more values referred to in the proposed ledger interaction, node 103-1 may access world state information, maintained by node 103-1, to determine such values. Such access may include checking a local cache and/or accessing, via a network, a remote system (e.g., a "cloud" system, a containerized system, etc.) associated with node 103-1 that maintains the world state associated with distributed ledger 101. The execution (at 204) may be a "simulation" of the proposed ledger interaction, inasmuch as the execution and of the proposed ledger interaction and the ensuing result may not yet be recorded to distributed ledger 101. The interaction may become "final" or "committed" based on validation by one or more other nodes. The result may include a "read-write set," which may include the values of the one or more attributes that were accessed (e.g., the values based on which the interaction was performed), as well as the resulting values after execution of the proposed interaction.

Node 103-1 may provide (at 206) the result set (e.g., the read-write set) based on executing (at 204) the proposed interaction to client 201. Client 201 may maintain the result set to, for example, verify and/or to provide approval of the result set before the result set is committed to distributed ledger 101. Node 103-1 may also provide (at 208) the proposed ledger interaction to one or more other nodes 103 associated with distributed ledger 101, such as nodes 103-2 and 103-3. In some embodiments, node 103-1 may provide (at 208) the result set generated by node 103-1 to nodes 103-2 and 103-3. Nodes 103-1 through 103-3 may all be associated with the same channel, nodes 103-2 and 103-3 may be specified by the smart contract as validators, and/or nodes 103-2 and 103-3 may otherwise be identified by node 103-1 or an associated distributed ledger management system as nodes that should validate, endorse, etc. the execution and result of the proposed interaction.

As similarly discussed with respect to node 103-1, nodes 103-2 and 103-3 may execute (at 210), and/or simulate the execution of, the proposed interaction. Accordingly, nodes 103-2 and 103-3 may access one or more values that were previously recorded to distributed ledger 101 using world state information maintained by nodes 103-2 and 103-3. Nodes 103-2 and 103-3 may validate, verify, etc. the result set generated by node 103-1 by comparing the result set with respective result sets generated by nodes 103-2 and 103-3. Nodes 103-2 and 103-3 may respond (at 212) to node 103-1 with respective result sets generated by nodes 103-2 and 103-3, and/or may respond with an indication, endorsement, etc. (e.g., which may be respectively signed by nodes 103-2 and 103-3) that the result set generated by node 103-1 is valid. Once node 103-1 has received endorsements from at least a threshold quantity of other nodes (e.g., from nodes 103-2 and 103-3, in this example), node 103-1 may determine that a consensus has been reached with respect to the result set for the proposed interaction.

As shown in FIG. 2B, node 103-1 may accordingly provide (at 214), to client 201, an indication that consensus for the result set (provided at 206) has been reached. In some embodiments, client 201 may validate the consensus (e.g., by evaluating signatures of nodes 103-2 and 103-3) and/or may verify the result set (e.g., by itself executing the proposed interaction). Client 201 may provide (at 216), to node 103-1, an indication that client 201 has validated the consensus and/or has verified the result set. In some embodiments, the consensus validation indication may be signed by client 201, thus securely authenticating the validation by client 201.

Node 103-1 may provide (at 218) the result set, along with the consensus validation indication and the proposed ledger interaction, to ordering node 203. Ordering node 203 may be a node, associated with the same channel as nodes 103-1 through 103-3, that validates (at 220) the consensus validation indication (e.g., validates signatures associated with client 201 and/or nodes 103-1 through 103-3) and generates a block, to be recorded to distributed ledger 101, that includes information regarding the ledger interaction. Such information may include an identifier of client 201 (e.g., an address, wallet identifier, etc.), identifiers of nodes 103-1 through 103-3 that participated in generating and/or validating the result set based on the ledger interaction, smart contract inputs provided by client 201, the consensus validation indication, one or more timestamps of the above operations and/or other events, and/or other suitable information associated with the ledger interaction. In some embodiments, the block may be signed by ordering node 203, thus securely authenticating the block creation by ordering node 203. At this point, the ledger interaction may no longer be a "proposed" ledger interaction, as the interaction has been finalized, committed, etc. by ordering node 203. In some implementations, nodes 103-1 through 103-3 may be referred to as "peers," to indicate that such nodes 103-1 through 103-3 are distinct from ordering node 203 (e.g., ordering node 203 performs one or more different operations from the peers).

Ordering node 203 may propagate (at 222) the signed block, including information regarding the finalized ledger interaction initiated by client 201, to nodes 103-1 through 103-3 and/or other nodes associated with the same channel. Nodes 103-1 through 103-3 may validate (at 224) the block, which may include verifying the signature of ordering node 203, and may accordingly update a respective copy of distributed ledger 101 as maintained by each one of nodes 103-1 through 103-3. Nodes 103-1 through 103-3 may maintain respective independent copies of distributed ledger 101, thus providing an element of decentralization to distributed ledger 101. As such, when adding the block (received at 222), nodes 103-1 through 103-3 may continue to maintain separate copies of the same distributed ledger 101, including the information regarding the finalized ledger interaction.

Nodes 103-1 through 103-3 may also maintain respective world state information 205 (e.g., world state information 205-1 through 205-3). For example, as discussed above, world state information 205 may include a portion of the information stored in distributed ledger 101, such as the latest version of some or all of the attributes for which information has been recorded to distributed ledger 101. Nodes 103-1 through 103-3 may accordingly update (at 226) respective copies of world state information 205 based on the received block. For example, in the event that the block includes a change in the value of a particular attribute, nodes 103-1 through 103-3 may update world state information 205-1 through 205-3, respectively, to replace a previous value of the attribute (e.g., a previous version of the attribute) with the newly received value of the particular attribute.

Figure 3:
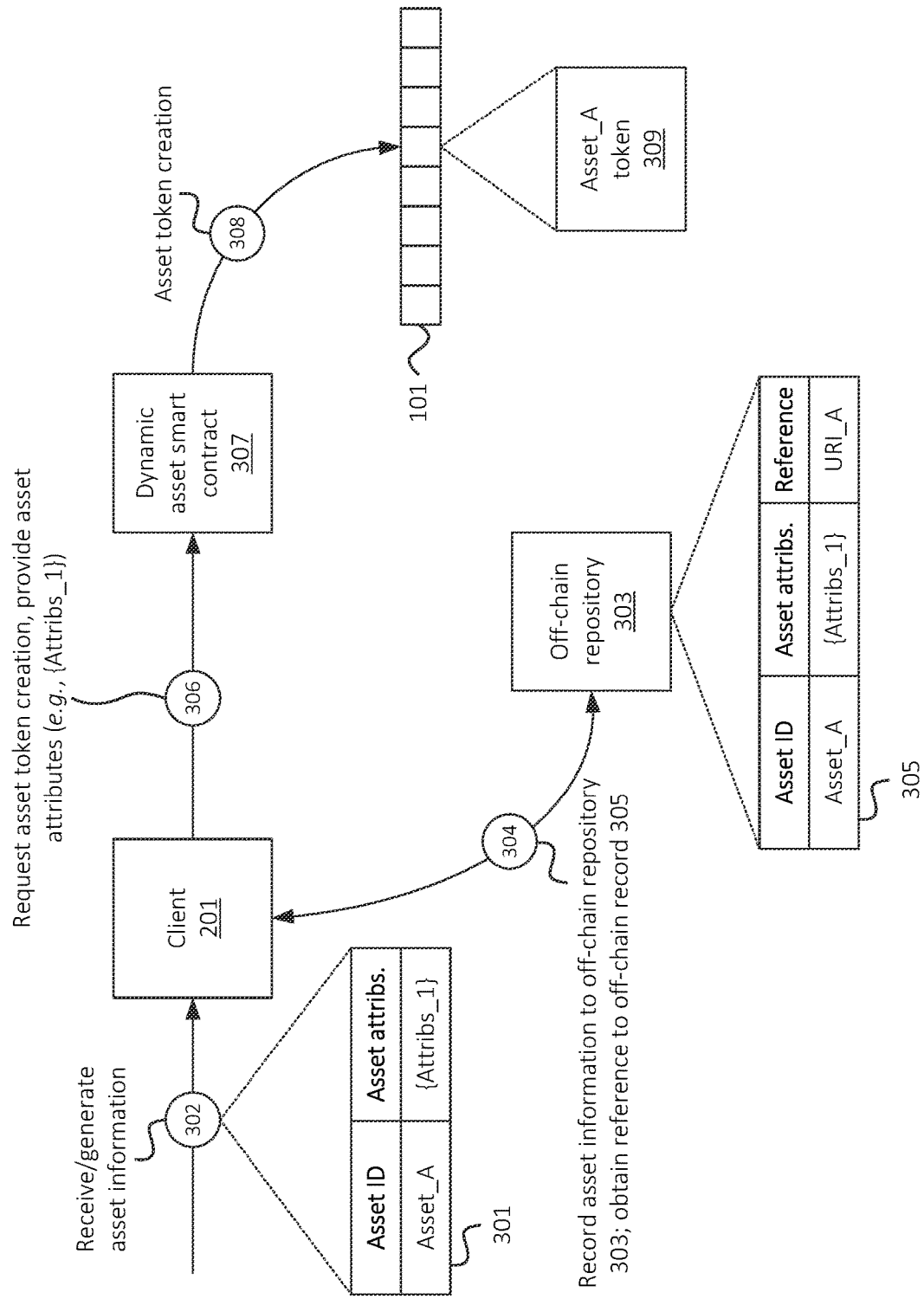
FIG. 3 illustrates an example of creating an asset token on a distributed ledger, in accordance with some embodiments.

As shown in FIG. 3, client 201 may receive or generate (at 302) asset information, conceptually represented in the figure as data structure 301. The asset information may represent or may otherwise be associated with a tangible asset, a digital asset, etc., such as a vehicle, a collectible item, a digital file, etc. Data structure 301 may include an identifier of the asset, which may be or may be based on a randomly generated alphanumerical string, a serial number, a vehicle identification number ("VIN"), or other unique identifier (e.g., that differentiates the asset from other assets, or from other instances or copies of the asset). In the examples described herein, the asset identifier is represented as "Asset_A." Data structure 301 may also include attributes of the asset (represented as "{Attribs_1}"), which may include information regarding characteristics of the asset, a URL or reference to one or more resources (e.g., an image file, a text file, a webpage, etc.), and/or other attributes or information regarding the asset.

The asset information may be received (at 302) from a database, a network-accessible resource, a user, or may be received from some other source or generated in some other suitable manner. In some embodiments, the asset may be a randomly or procedurally generated digital asset, and the attributes may reflect the random or procedural generation of the digital asset (e.g., may include randomly or procedurally determined or selected attributes), which may be generated by client 201 and/or some other entity, device, or system.

In accordance with some embodiments, client 201 may record (at 304) the asset information to off-chain repository 303, which may be a database, server, or other type of repository or storage device. In some embodiments, off-chain repository 303 may be integrated in or implemented by the same device or system that implements client 201. In some embodiments, off-chain repository 303 may be implemented by a different device or system from a device or system that implements client 201 (e.g., client 201 may communicate with off-chain repository 303 via a network or some other suitable communication pathway). Off-chain repository 303 may be "off-chain" with regard to distributed ledger 101, inasmuch as off-chain repository 303 may be separate and independent from the generation or maintenance of distributed ledger 101, on which a dynamic asset token, associated with the asset and/or reflecting changes made to the asset, in accordance with embodiments described herein, may be recorded. In some embodiments, off-chain repository 303 may be or may include a distributed ledger (e.g., a separate distributed ledger from distributed ledger 101, which may be implemented by a different set of nodes than nodes 103 that maintain distributed ledger 101). In some embodiments, off-chain repository 303 may be implemented as a different type of storage or recordation mechanism, that is different from a distributed ledger. In some embodiments, off-chain repository 303 may be accessible by client 201 and/or one or more authorized entities, which may participate in a registration and/or authentication procedure with off-chain repository 303 or client 201 to establish such authorization.

As shown, once the asset information is recorded to off-chain repository 303, off-chain repository 303 may maintain the asset information along with a reference, as represented in example data structure 305. Data structure 305 may include, for example, the asset information (e.g., asset identifier and asset attributes) provided by client 201, as well as a reference to the information as stored in off-chain repository 303. The reference may include a Uniform Resource Identifier ("URI"), a URL, a pointer, a primary key, and/or some other reference or locator information that denotes the provided asset information. For example, information for different assets may be associated with different references. In some embodiments, different versions of information for the same asset may be associated with different references, as discussed below. For example, client 201 and/or some other entity may query off-chain repository 303 with the reference, and off-chain repository 303 may return particular asset information in response to the query. For example, a query for (or other access of) "URI_A may return the identifier "Asset_A" and/or the set of asset attributes "{Attribs_A}."

Client 201 may also request (at 206) the creation of an asset token based on the asset information. For example, client 201 may determine that the asset information received or generated (at 302) is associated with an asset for which an asset token does not exist on distributed ledger 101, such as by checking records of distributed ledger 101 and/or off-chain repository 303 for the asset identifier and/or other suitable information that may indicate whether an asset token has already been recorded to distributed ledger 101 for the asset.

Requesting (at 306) may include invoking a smart contract, executing chaincode, etc. that has been recorded to distributed ledger 101 (e.g., Dynamic Token Smart Contract ("DTSC") 307). DTSC 307 may be recorded as one or more records to distributed ledger 101, and/or may refer to multiple smart contracts recorded to distributed ledger 101, that perform some or all of the operations described herein, in accordance with some embodiments.

As shown, DTSC 307 may create (at 308) the requested asset token 309 on distributed ledger 101, which may include recording one or more records to distributed ledger 101 (e.g., as discussed above with regard to FIGS. 2A and 2B) that represent the provided asset information (e.g., including {Attribs_1}) and/or other suitable information or metadata, such as a time of creation, an owner of the asset token (e.g., an address or identifier of client 201), and/or other suitable information. As asset token 309 is associated with the underlying asset denoted with the identifier "Asset_A," asset token is also referred sometimes as "Asset_A token" 309.

Figure 4A:
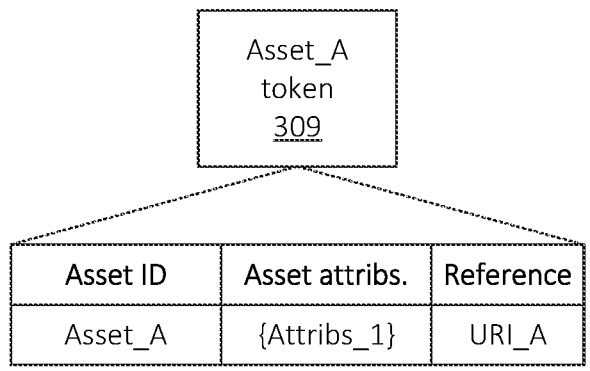
FIGS. 4A-4C illustrate examples of a dynamic asset token recorded to a distributed ledger, in accordance with some embodiments.
Figure 4B:
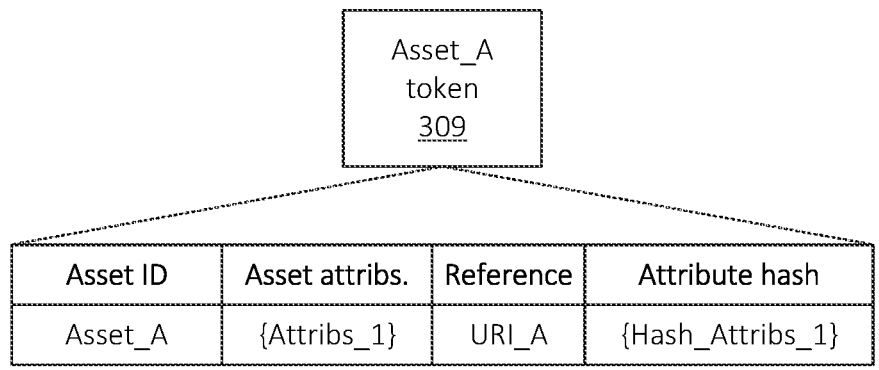
Figure 4C:
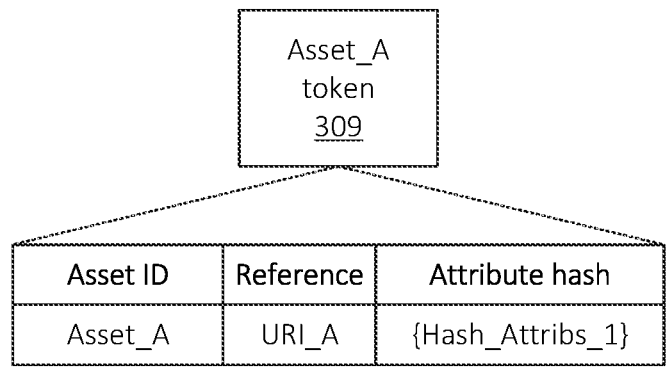

FIGS. 4A-4C illustrate examples of information that may be represented or recorded for asset token 309 (e.g., the dynamic token representing the asset referred to as "Asset_A"). As shown in FIG. 4A, in some embodiments, asset token 309 may include the identifier (e.g., "Asset_A"), the asset attributes (e.g., "{Attribs_1}"), and the reference to the asset information as recorded to off-chain repository 303.

In some embodiments, as shown in FIG. 4B, asset token 309 may also include an attribute hash (e.g., in addition to the information shown in FIG. 4A). The attribute hash may include one or more values generated based on performing a cryptographic hashing function or other suitable function that generates the one or more values based on an input of the attributes of the asset. For example, client 201 may generate a hash based on the asset attributes (e.g., may generate {Hash_Attribs_1} based on {Attribs_1}), one or more nodes 103 maintaining distributed ledger 101 may generate the hash based on the attributes (e.g., executing or invoking DTSC 307 may include generating the attribute hash based on the attributes when the attributes are specified as an input of DTSC 307), and/or some other suitable device or system may generate or provide the attribute hash.

In the example of FIG. 4C, asset token 309 may not include the attributes themselves. For example, the reference to off-chain repository 303 (e.g., URI_A), may be used by client 201 or other entity accessing asset token 309 to identify the asset attributes. While FIGS. 4A-4C are provided as example arrangements of asset token 309, in some embodiments, asset token 309 may include additional, different, or less information. For example, as discussed above, asset token 309 may include metadata provenance information, such as a time of creation, an owner of asset token 309, and/or other suitable information. In some embodiments, asset token 309 may include an asset identifier and an attribute hash, but may omit the attributes themselves and/or may omit the reference to off-chain repository 303, in accordance with some embodiments.

Figure 5:
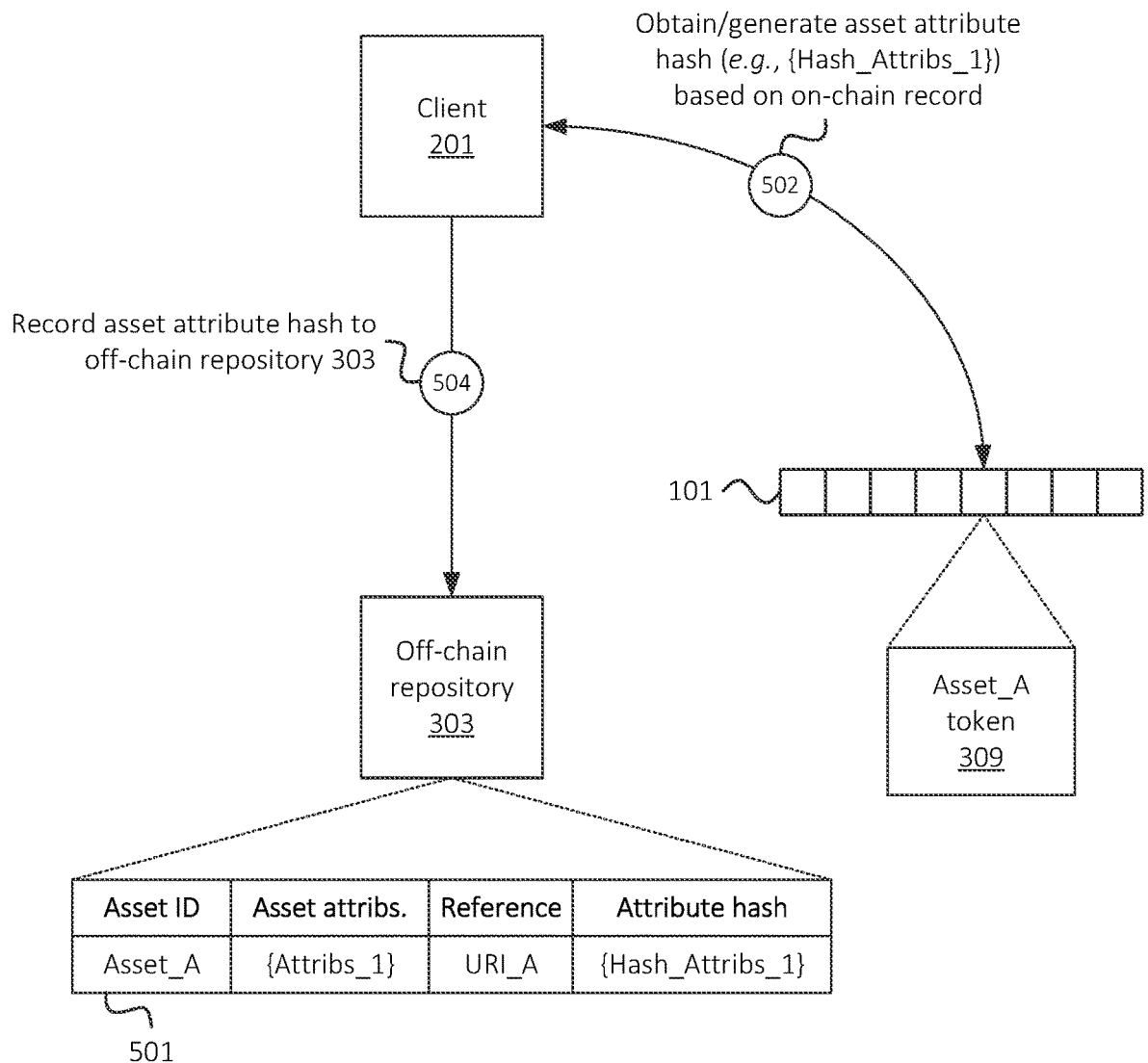
FIG. 5 illustrates an example of maintaining an attribute hash to an off-chain repository, in accordance with some embodiments.

In some embodiments, as shown in FIG. 5, off-chain repository 303 may maintain an attribute hash associated with a particular asset and a particular set of attributes (e.g., a particular version of the attributes for the asset). For example, as shown, client 201 may obtain (at 502) an attribute hash associated with the asset (e.g., {Hash_Attribs_1}) from distributed ledger 101, in embodiments where asset token 309 includes the attribute hash. Client 201 may identify asset token 309 based on the asset identifier associated with the asset, as included in asset token 309. In some embodiments, client 201 may identify asset token 309 based on other suitable information or using other suitable techniques. For example, in some embodiments, as part of the creation (at 308) of asset token 309, client 201 may identify or receive an address, transaction identifier, or other indication of a particular record of distributed ledger 101 that includes asset token 309.

In some embodiments, client 201 may generate (at 502) the hash of the attributes of the asset based on information included in asset token 309. For example, in situations where asset token 309 does not include the attribute hash, or in other situations, client 201 may generate the attribute hash by performing a cryptographic hashing function or other suitable function using the asset attributes included in asset token 309, or on asset attributes included in off-chain repository 303 as referred to by asset token 309 (e.g., client 201 may access such attributes using the reference included in asset token 309, such as URI_A). Client 201 may further record (at 504) the attribute hash to off-chain repository 303. As such, off-chain repository 303 may include information (represented as data structure 501) associating the asset and its attributes with the attribute hash. In some embodiments, off-chain repository 303 may append the attribute hash to previously stored information associated with the attribute (e.g., data structure 305), or may generate and maintain data structure 501 in addition to data structure 305 (e.g., where data structure 501 is a "current" or "valid" set of information associated with the asset, based on having been generated after data structure 305). Although FIG. 5 illustrates an example in which off-chain repository 303 maintains information associating the asset with a particular set of attributes, off-chain repository 303 may not maintain such information in some embodiments, as discussed below.

Figure 6:
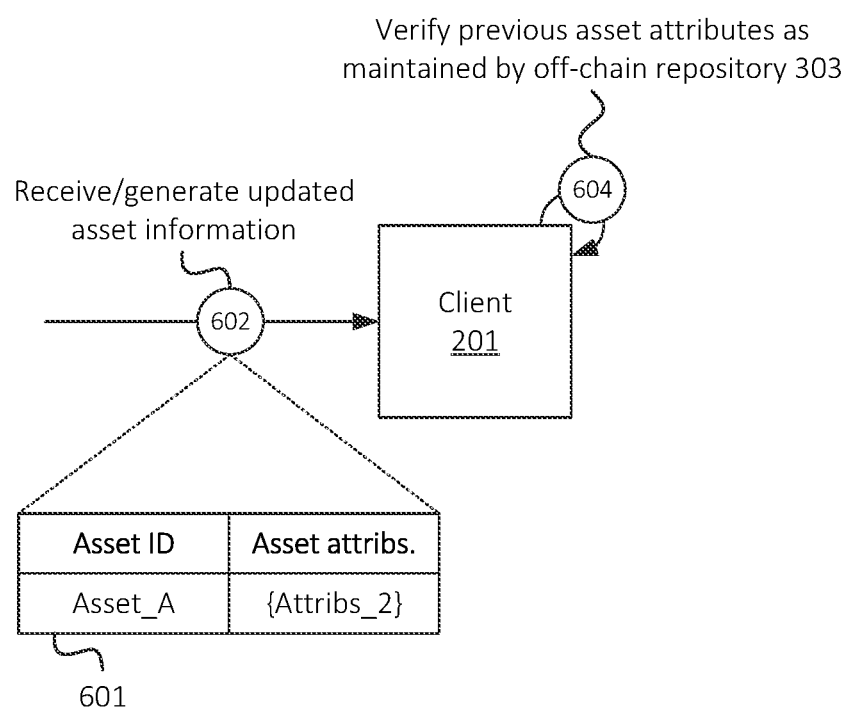
FIGS. 6-9 illustrate examples of verifying attribute information, associated with a particular asset, recorded to an off-chain repository, in accordance with some embodiments.

As shown in FIG. 6, client 201 may receive or generate (at 602) updated asset information. For example, client 201 may receive or otherwise determine that one or more of the attributes of the asset have changed, that one or more attributes should be removed, that one or more attributes should be added, etc. In the example of the asset being a vehicle, the updated asset information may be the performance of a maintenance or repair service, an updated mileage reading, etc. In the example of the asset being a digital asset, the updated asset information may include a URL to a different resource that hosts the asset (e.g., the asset may have been located or hosted at one web server, and may have been moved to another web server) and/or other modifications. The updated attributes are represented in example data structure 601 as "{Attribs_2}."

As discussed below, in accordance with some embodiments, client 201 may record the modifications to distributed ledger 101, such that distributed ledger 101 may maintain the metadata, provenance, attribute history, and other information associated with asset token 309, while also maintaining the updated attributes of the underlying asset. In some embodiments, prior to such recordation, client 201 may verify (at 604) that the asset attributes, as maintained by off-chain repository 303, have not been tampered with or otherwise modified in the time between recordation (at 304) of such information to off-chain repository 303 and the receipt (at 602) of the updated asset attributes. On the other hand, in some embodiments, client 201 may proceed with recording the updated asset attributes, as discussed below, without verifying (at 604) the information stored in off-chain repository 303.

Figure 7:
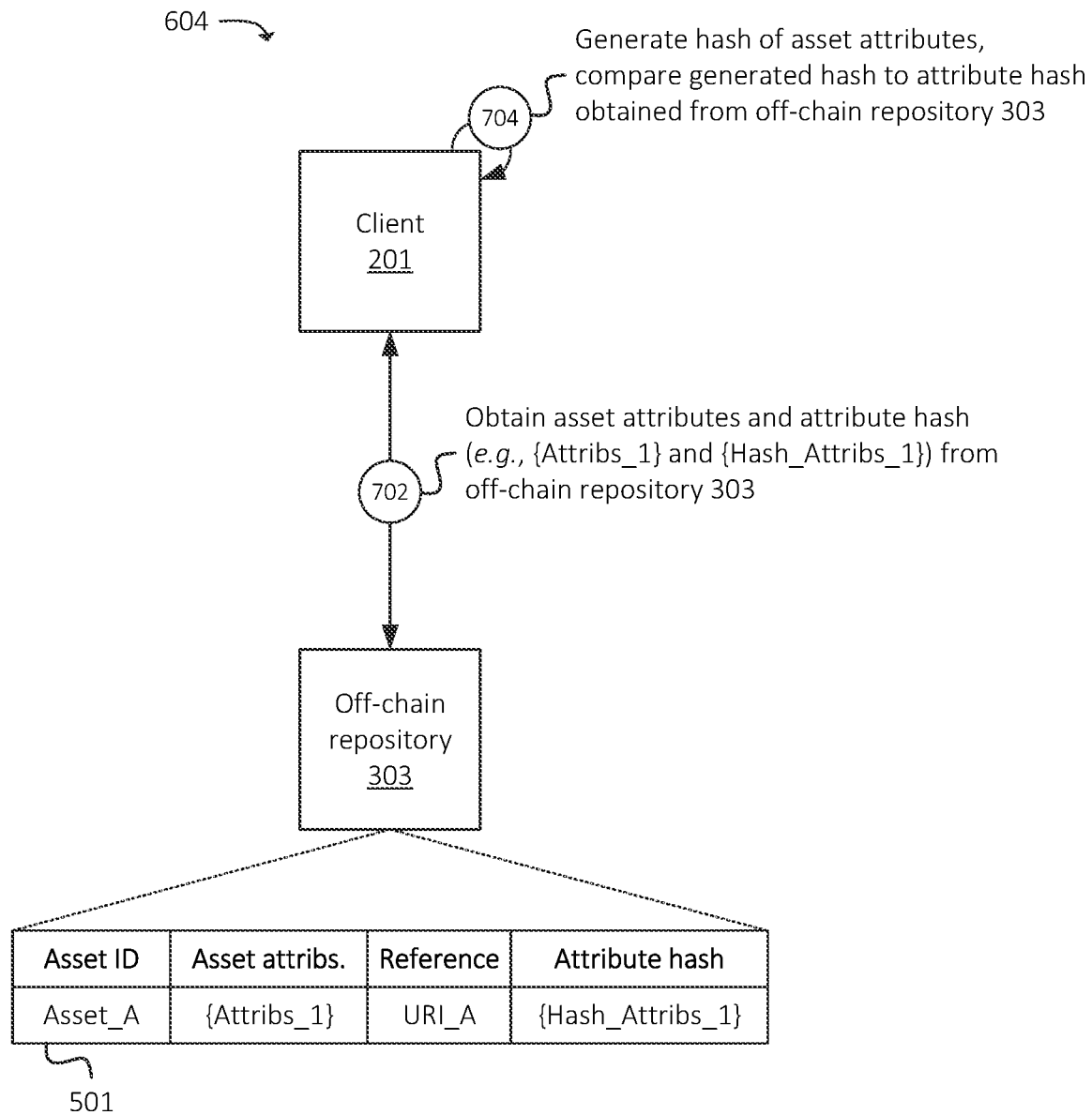
Figure 8:
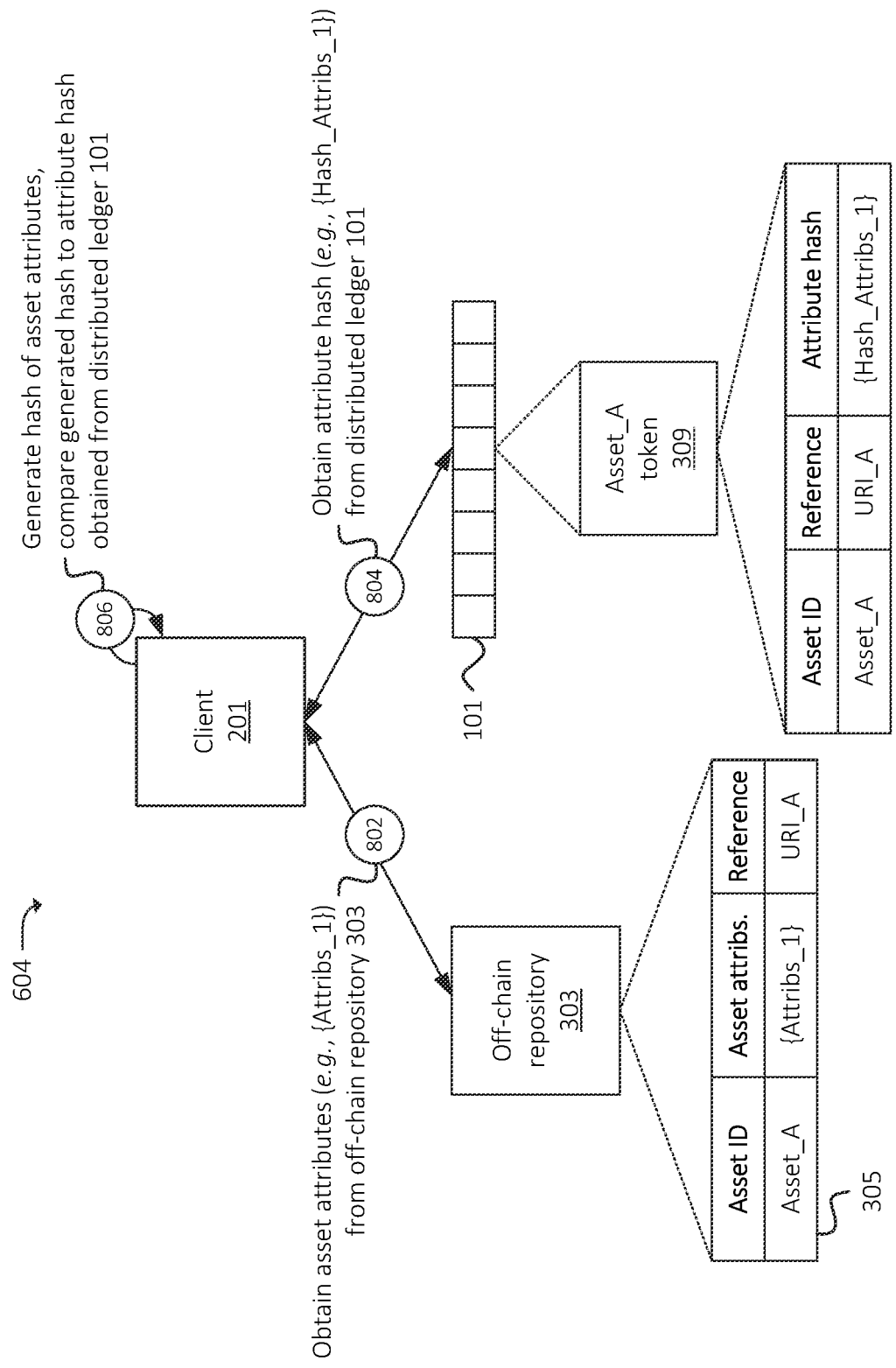
Figure 9:
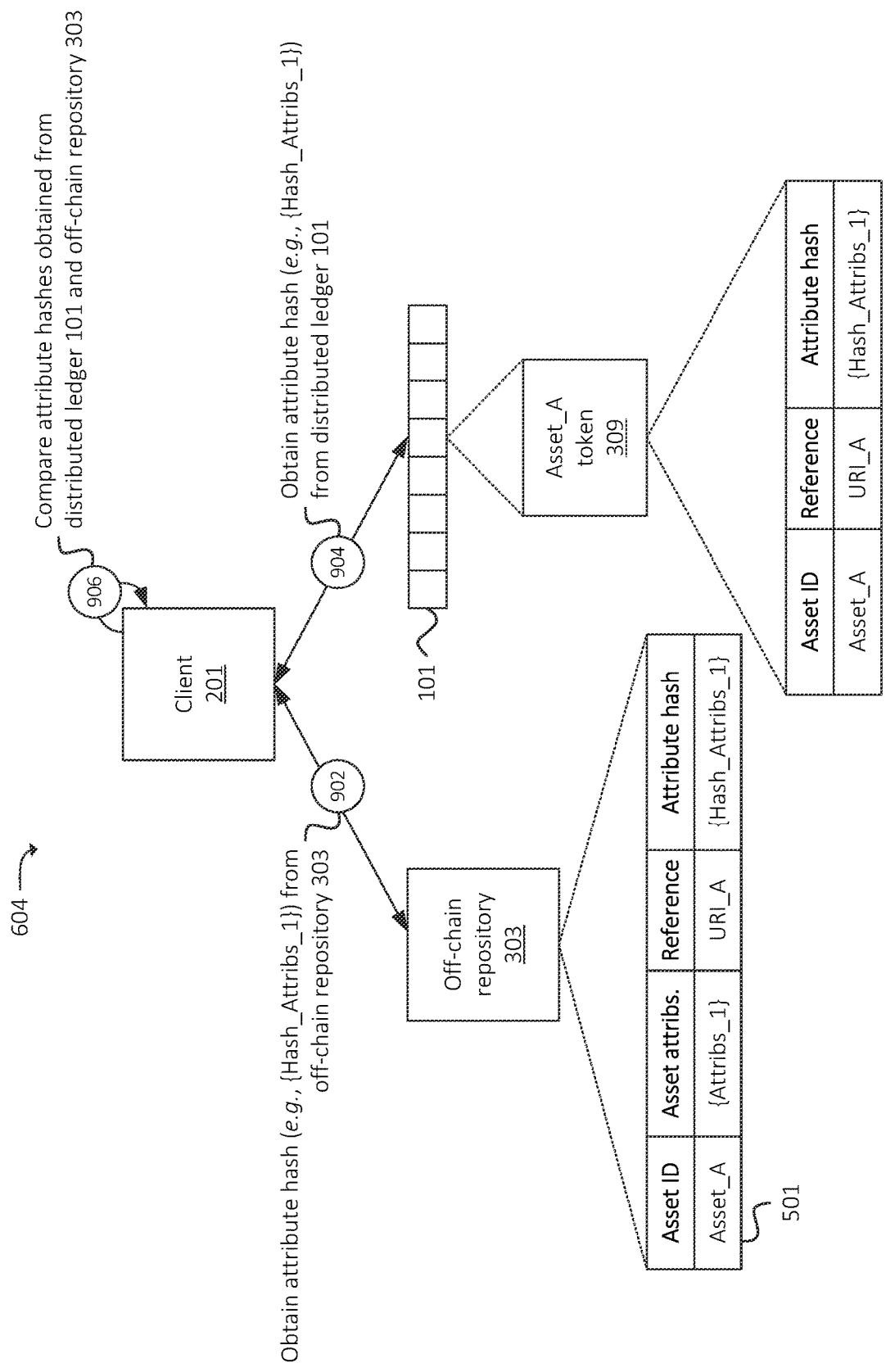

FIGS. 7-9 illustrate examples of verifying (at 604) the asset attributes stored by off-chain repository 303. These examples refer to a situation in which client 201 verifies the first set of attributes (e.g., {Attribs_1}) after receiving the first updated set of attributes (e.g., {Attribs_2}). Similar operations may apply when receiving subsequent updates. For example, when receiving a fifth updated set of attributes, client 201 may verify the most recent information for the asset in off-chain repository 303 (e.g., a fourth set of attributes and/or a combination of first, second, third, and/or fourth, attributes).

As shown in FIG. 7, client 201 may obtain (at 702) the set of attributes and the attribute hash (i.e., a first attribute hash, in this example) from off-chain repository 303. Client 201 may generate (at 704) a hash based on the set of attributes (i.e., a second attribute hash, in this example), and may compare the obtained attribute hash to the generated attribute hash (e.g., the first and second attribute hashes). If the generated attribute hash and the obtained attribute hash match, this may indicate that the attributes (e.g., {Attribs_1}) have not changed since they were recorded to off-chain repository 303. Such verification may be useful in situations where, for example, the attributes include a link to a network-accessible resource which may not necessarily be under the control of off-chain repository 303 (e.g., an administrator or operator of the network-accessible resource may modify the resource itself, which may not necessarily be reflected in a URL or other reference to the resource when such URL or reference is included in {Attribs_1}).

FIG. 8 illustrates another example of verifying (at 604) asset attribute information stored by off-chain repository 303. As shown, client 201 may obtain (at 802) asset information from off-chain repository 303, and may obtain (at 804) an attribute hash from asset token 309 (i.e., a first hash, in this example). For example, in this example, data structure 305 may not include an attribute hash, and/or asset token 309 may not include the attributes themselves (e.g., may include a reference to data structure 305 as maintained by off-chain repository 303, based on which an entity accessing asset token 309 may identify the attributes of the underlying asset). Client 201 may generate (at 806) a hash based on the attributes obtained from off-chain repository 303 (i.e., a second hash, in this example), and may compare the obtained attribute hash to the generated attribute hash (e.g., may compare the first and second attribute hashes). If the attribute hashes match, this may indicate that the attribute information maintained in off-chain repository 303 is accurate (e.g., has not changed since the creation of asset token 309). Such verification may be useful in situations where asset token 309 does not include asset attributes themselves in order to conserve storage resources used to maintain distributed ledger 101.

FIG. 9 illustrates another example of verifying (at 604) asset attribute information stored by off-chain repository 303. As shown, client 201 may obtain (at 902) a first attribute hash from off-chain repository 303, and may obtain (at 904) a second attribute hash from distributed ledger 101 (e.g., as included in asset token 309). As noted above, client 201 may identify the latest or most recent information for the asset in off-chain repository 303 and distributed ledger 101, such as in situations where multiple instances of updated information have been recorded to off-chain repository 303 and/or distributed ledger 101 in accordance with embodiments described herein. As such, the first and second attribute hashes may be the latest (or otherwise valid) attribute hashes in off-chain repository 303 and distributed ledger 101 for the asset, out of multiple potential attribute hashes for the asset which may be included in off-chain repository 303 and distributed ledger 101. Client 201 may compare (at 906) the first and second attribute hashes. When these hashes match, this may indicate to client 201 that off-chain repository 303 maintains an accurate attribute hash and, accordingly, an accurate set of attributes for the asset. This type of verification may be useful in situations where off-chain repository 303 is trusted or is immutable (e.g., is implemented as a distributed ledger), and client 201 may verify the information stored therein without computing a hash of the attributes of the asset.

After receiving (at 602) the updated asset information and, in some embodiments, verifying (at 604) the asset information stored by off-chain repository 303, client 201 may record (at 1002) the updated asset information (e.g., {Attribs_2} to off-chain repository 303. The updated information may be reflected in data structure 1001, which may be associated with a different reference, locator, link, etc. (e.g., "URI_B") than the previously recorded attributes (e.g., {Attribs_A} associated with URI_A, as reflected in data structures 305 and/or 501). Data structure 1001 may include the new attributes appended to or otherwise added to the previous attributes, represented as "{Attribs_1}, {Attribs_2}" in the figure. In some embodiments, the new attributes may replace the previous attributes in data structure 1001. In some embodiments, the request (at 1002) from client 201 may specify the manner of the modification of the asset attribute information (e.g., the appending of the new attributes to the previous attributes, the replacement of the previous attributes with the new attributes, and/or other suitable modifications). Data structure 1001 may also include a hash of the previous asset attributes (e.g., {Hash_Attribs_1}) and/or other suitable reference to the previous asset attributes. Examples of other arrangements of attribute information, maintained by off-chain repository 303, based on multiple updates, are discussed below with regard to FIGS. 12A-12C.

Client 201 may further obtain (at 1002) other updated asset information recorded to off-chain repository 303, such as a reference to the updated asset information (e.g., URI_B) as stored in off-chain repository 303, a reference to the updated asset information (e.g., URI_A), the previous attributes themselves (e.g., {Attribs_1}), and/or other suitable information. Client 201 may further request (at 1004) a modification to the dynamic asset token, and/or may otherwise indicate a modification to the underlying asset, such as by invoking DTSC 307 and/or performing other suitable interactions with distributed ledger 101. As part of the request, client 201 may provide suitable input information, as specified by DTSC 307, to facilitate the asset token modification. For example, in some embodiments, such input information may include the updated attributes (e.g., {Attribs_2}), the updated attributes appended to or otherwise combined with the previous attributes (e.g., {Attribs_1} and {Attribs_2}), the previous set of attributes (e.g., {Attribs_1}), the previous attribute hash (e.g., {Hash_Attribs_1}), and/or other suitable information.

DTSC 307 may utilize some or all of the input information to verify (at 1006) that the modified parameters incorporate, modify, or otherwise reflect the previous set of attributes associated with the asset. This verification process may further serve to mitigate or avoid situations in which the original asset is replaced with a new asset (e.g., a malicious attempt to swap the asset as reflected by the asset token with a different asset), or may at least serve as an immutable and traceable record of such replacement in situations where the asset is swapped with a different one (e.g., in a bona fide or otherwise authorized swap or modification). This verification may also ensure that all modifications, including adding of attributes, replacing of attributes, deletion of attributes, etc. is reflected and accessible via distributed ledger 101.

In situations where the request (at 1004) includes the previous attribute hash (e.g., {Hash_Attribs_1}), DTSC 307 may identify the attribute hash associated with asset token 309 (e.g., may retrieve the attribute hash included in asset token 309, or may compute the attribute hash based on attributes included in asset token 309), and may compare the received (at 1004) previous attribute hash to the attribute hash identified or computed based on information included in asset token 309. In situations where the request (1004) includes the previous attributes (e.g., {Attribs_1}), DTSC 307 may compute the previous attribute hash and may compare such computed attribute hash to an attribute hash included in, or computed based on values included in, asset token 309. In this manner, DTSC 307 may verify that the request (at 1004) properly incorporates, refers to, modifies, etc. the same asset that is reflected by asset token 309.

Although discussed herein as DTSC 307 performing operations such as "computing" an attribute hash, "identifying" an attribute hash, "verifying" hashes, etc., some or all of these operations may, in practice, be performed by a particular node 103 or other suitable device or system based on instructions, chaincode, or other information specified by or included in DTSC 307.

Figure 11A:
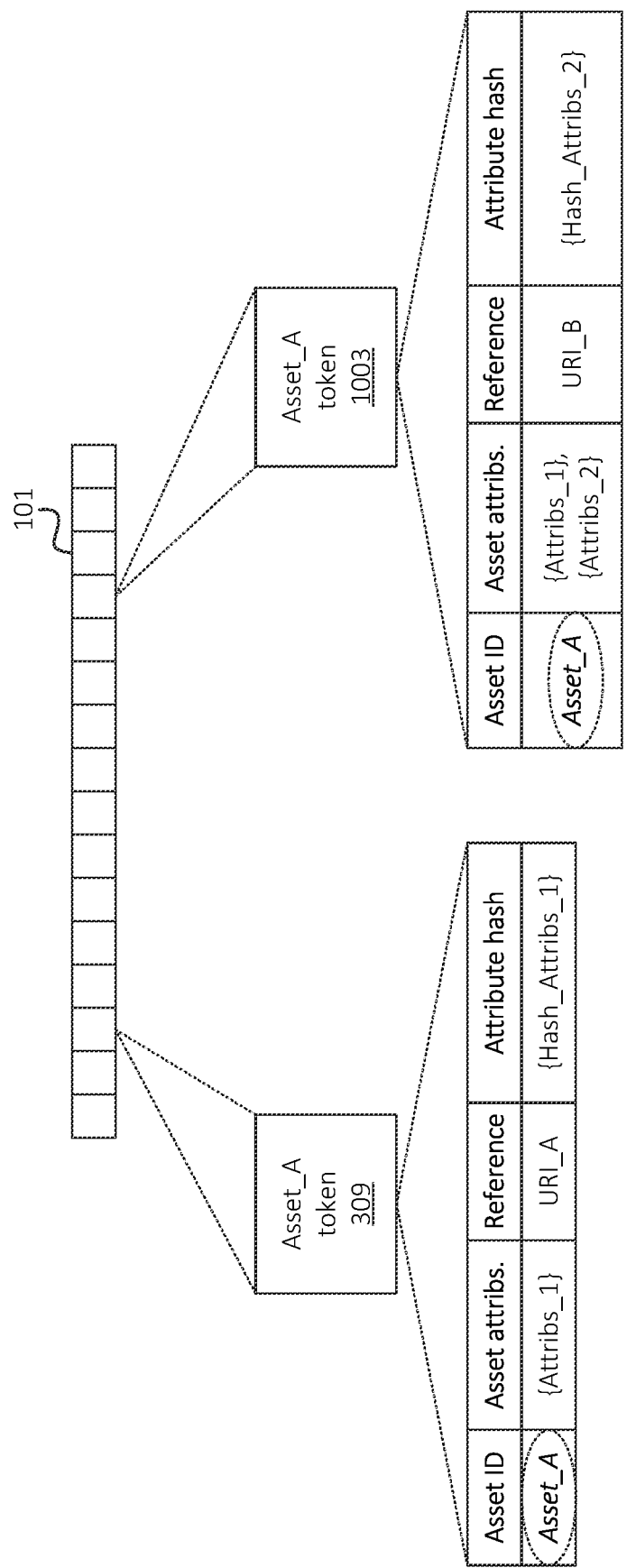
FIGS. 11A and 11B illustrate examples of asset tokens, recorded to a distributed ledger, after a modification of an underlying asset has been recorded to the distributed ledger, in accordance with some embodiments.
Figure 11B:
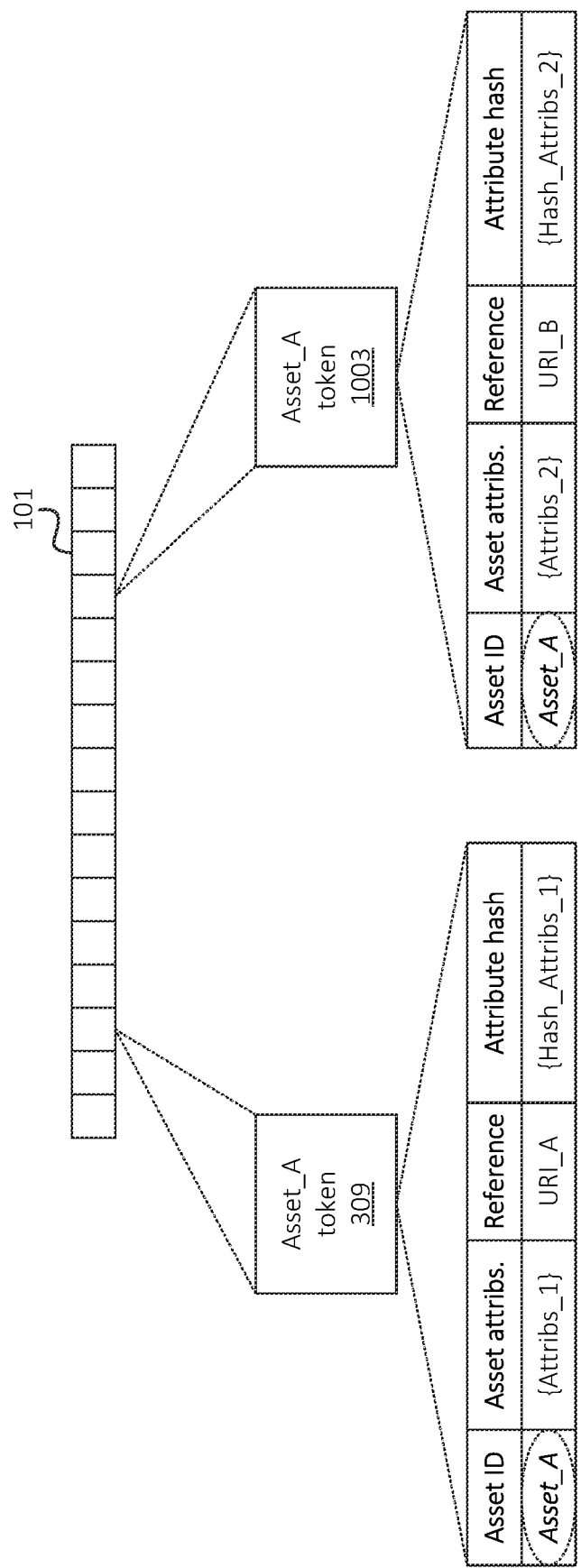

Once DTSC 307 has verified (at 1006) that the modified attributes are associated with the asset as previously recorded to distributed ledger 101 (e.g., as asset token 309), DTSC 307 may record (at 1008) the modification to asset token 309. Recording (at 1008) the modification to asset token 309 may include generating or recording a new record (e.g., including asset token 1003) to reflect the modifications to the asset. At this point, as shown in FIGS. 11A and 11B, distributed ledger 101 may include both asset token 309 and asset token 1003, which are both associated with the same asset (e.g., the asset represented by the identifier "Asset_A"). Since asset token 1003 is a later-recorded record, a world state associated with distributed ledger 101 may include the asset attributes as indicated by asset token 1003 (e.g., may replace asset attributes, as indicated by asset token 309, with asset attributes as indicated by asset token 1003). Additionally, or alternatively, client 201 and/or some other entity accessing distributed ledger 101 may identify both asset token 309 and asset token 1003, and may identify that asset token 1003 reflects current attribute information for the asset while asset token 309 reflects historical attribute information for the asset.

As noted above, the updated asset attributes, as received (at 1004) by DTSC 307, may be appended to the previous attributes that were previously associated with asset token 309, as shown in FIG. 11A. In such scenarios, asset token 1003 may include the previous asset attributes (e.g., {Attribs_A}), as well as the updated asset attributes (e.g., {Attribs_B}). In some embodiments, the updated asset attributes, as received (at 1004) by DTSC 307, may replace the previous attributes, as shown in FIG. 11B. In such scenarios, asset token 1003 may include the updated asset attributes (e.g., {Attribs_B}) but may not include the previous asset attributes (e.g., {Attribs_A}). As discussed above, DTSC 307 may be configured to combine (e.g., append) or replace the updated asset attributes with the previous asset attributes when creating asset token 1003, and/or client 201 may specify whether to combine or replace the updated asset attributes with the previous asset attributes for the creation of asset token 1003 (e.g., may provide an input value to DTSC 307 to specify whether to combine or replace the asset attributes).

Asset token 1003 may also, in some embodiments, include an attribute hash based on the updated set of attributes. In FIGS. 11A and 11B, this hash is referred to as "{Hash_Attribs_2}." In the example of FIG. 11A, {Hash_Attribs_2} may be generated based on performing a hashing operation and/or other suitable operation on the full set of attributes included in asset token 1003 (e.g., {Attribs_1} and {Attribs_2}).

As noted above, the operations discussed above may be performed in an iterative manner, such that off-chain repository 303 and distributed ledger 101 both maintain asset attributes in a manner that indicates that the asset attributes have not been modified or tampered with. FIGS. 12A-12D illustrate examples of information that may be maintained by off-chain repository 303 after four updates to the asset, and FIG. 13 illustrate example information that may be maintained by distributed ledger 101 after the same four updates to the same asset.

As shown in FIG. 12A, data structure 1201, as maintained by off-chain repository 303 in accordance with some embodiments, may include a record of each update made to the asset, including a first update to add {Attribs_2} to {Attribs_1}, a second update to replace {Attribs_1} and {Attribs_2} with {Attribs_3}, a third update to add {Attribs_4} to {Attribs_3}, and a fourth update to replace {Attribs_3} and {Attribs_4} with {Attribs_5}. As similarly described above, each updated set of attributes may be associated with a reference (e.g., the first update is associated with URI_B, the second update is associated with URI_C, etc.). Each update may also include a reference to a previous set of attributes, as well as a hash of the previous set of attributes (e.g., the first update may include URI_A and {Hash_Attribs_1}, the second update may include URI_B and {Hash_Attribs_2}, and so on).

Figure 12B:
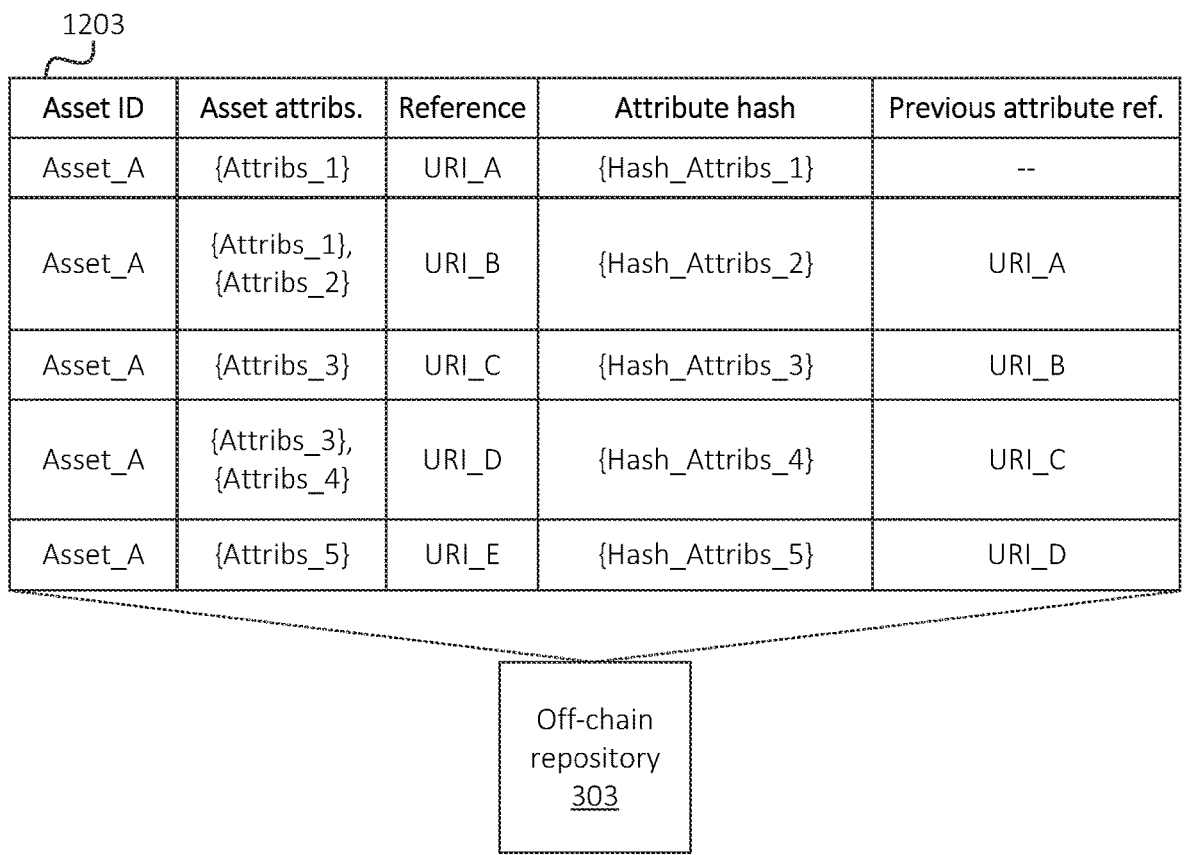
Figure 13:
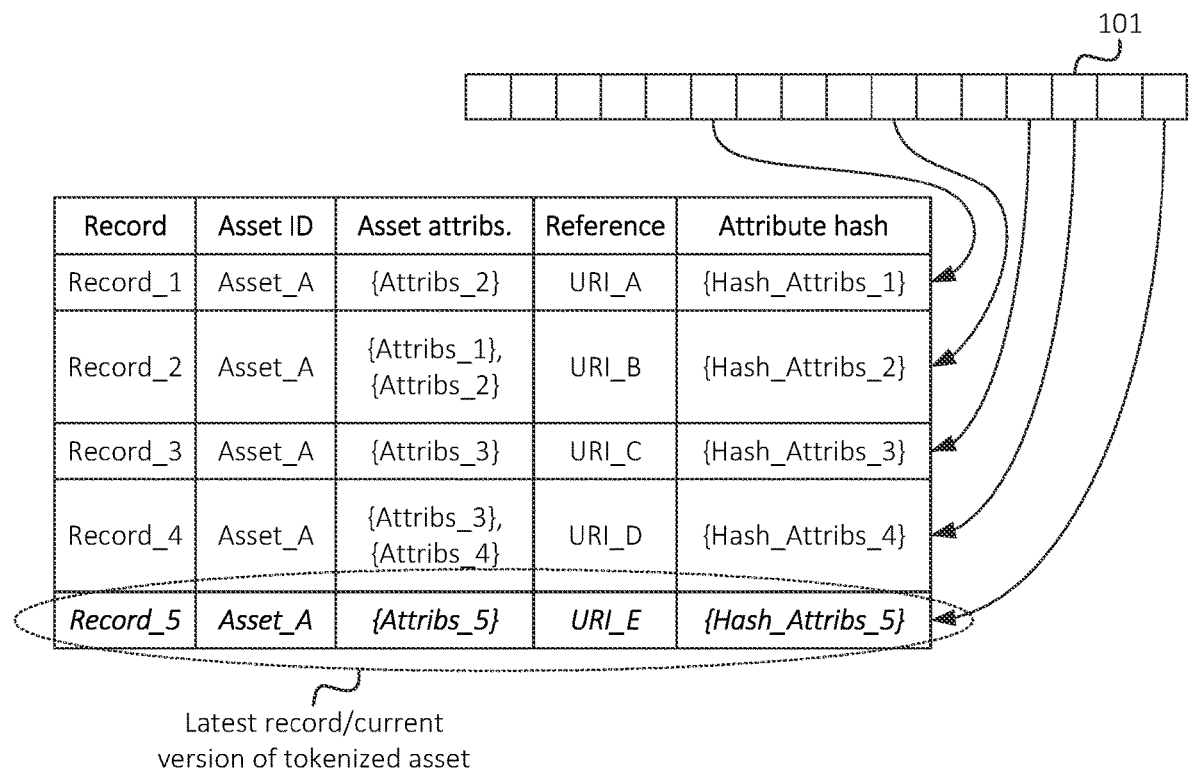
FIG. 13 illustrates example records, associated with a dynamic asset token, that may be recorded to a distributed ledger after multiple modifications to the attributes of a given asset, in accordance with some embodiments.

As shown in FIG. 12B, data structure 1203, as maintained by off-chain repository 303 in accordance with some embodiments, may also include a record of each update made to the asset. In this example, records associated with each update may include a reference to a record of the previous update (or, in the case of the first update, a reference to the record of the initial creation of the asset), as well as an attribute hash of each update. In this example, while records for each update do not explicitly include a reference to the hash of the previous attributes, the previous attribute hash may be computed by identifying the previous attributes based on the refence to the previous attributes, and performing a suitable hashing operation on the previous attributes referred to by such reference.

Figure 12C:
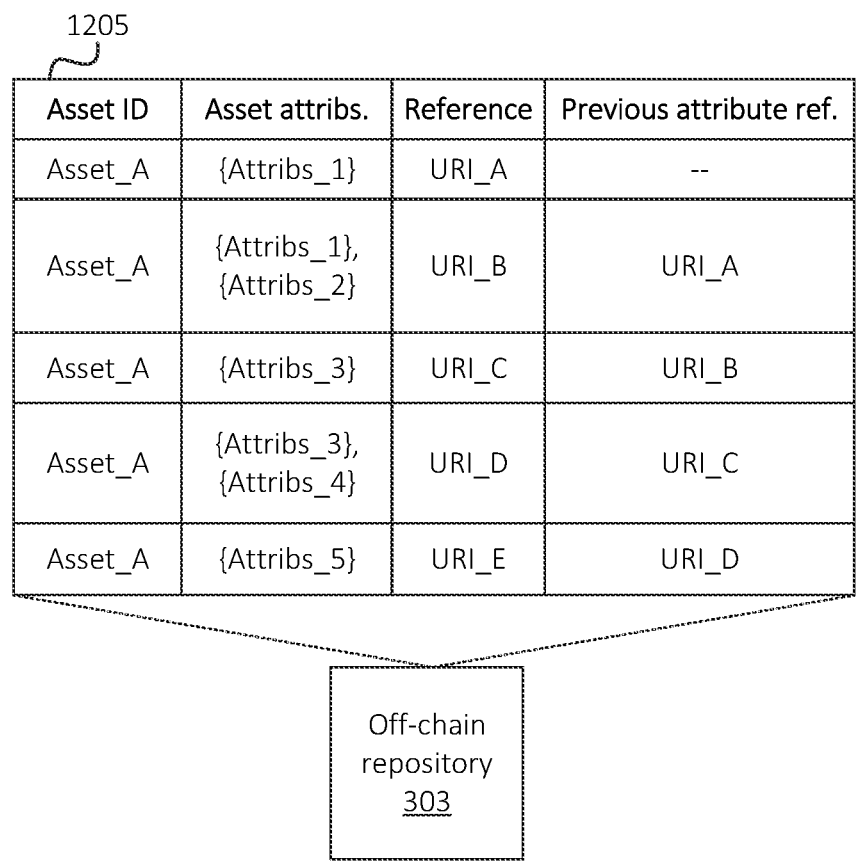

As shown in FIG. 12C, data structure 1205, as maintained by off-chain repository 303 in accordance with some embodiments, may also include a record of each update made to the asset. In this example, data structure 1205 may not include attribute hashes. Client 201 or other suitable entity accessing off-chain repository 303 may compute attribute hashes, including previous attribute hashes of a given update, based on the attributes included in data structure 1205 as well as the references to previous updates included in data structure 1205.

Figure 12D:
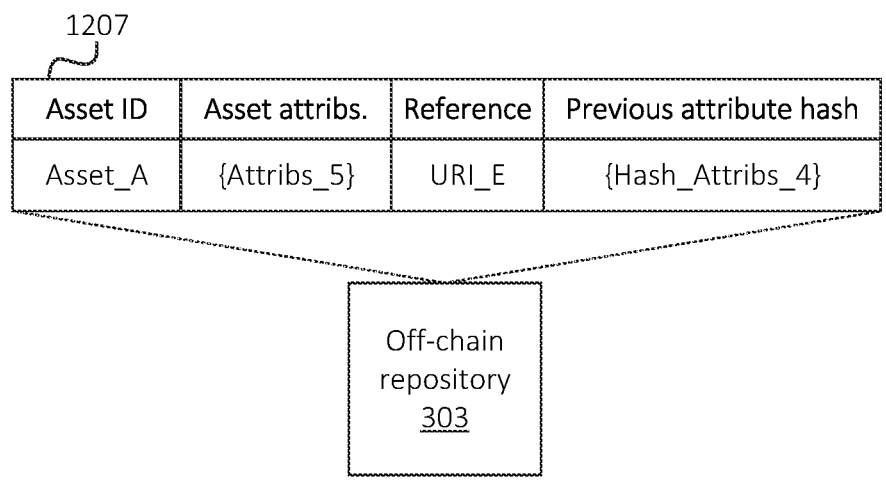

As shown in FIG. 12D, data structure 1207, as maintained by off-chain repository 303 in accordance with some embodiments, may include a record of fewer than all updates made to the asset. In this example, data structure 1207 includes only the latest update to the asset. The other updates may be discarded, subject to garbage collection, etc. in order to preserve storage resources of off-chain repository 303. The chain of updates may be maintained by virtue of the previous attribute hash included in data structure 1207. As discussed above, in situations where this attribute hash matches an attribute hash stored by distributed ledger 101 for the corresponding asset, the attributes maintained by off-chain repository 303 may be verified.

Figure 10:
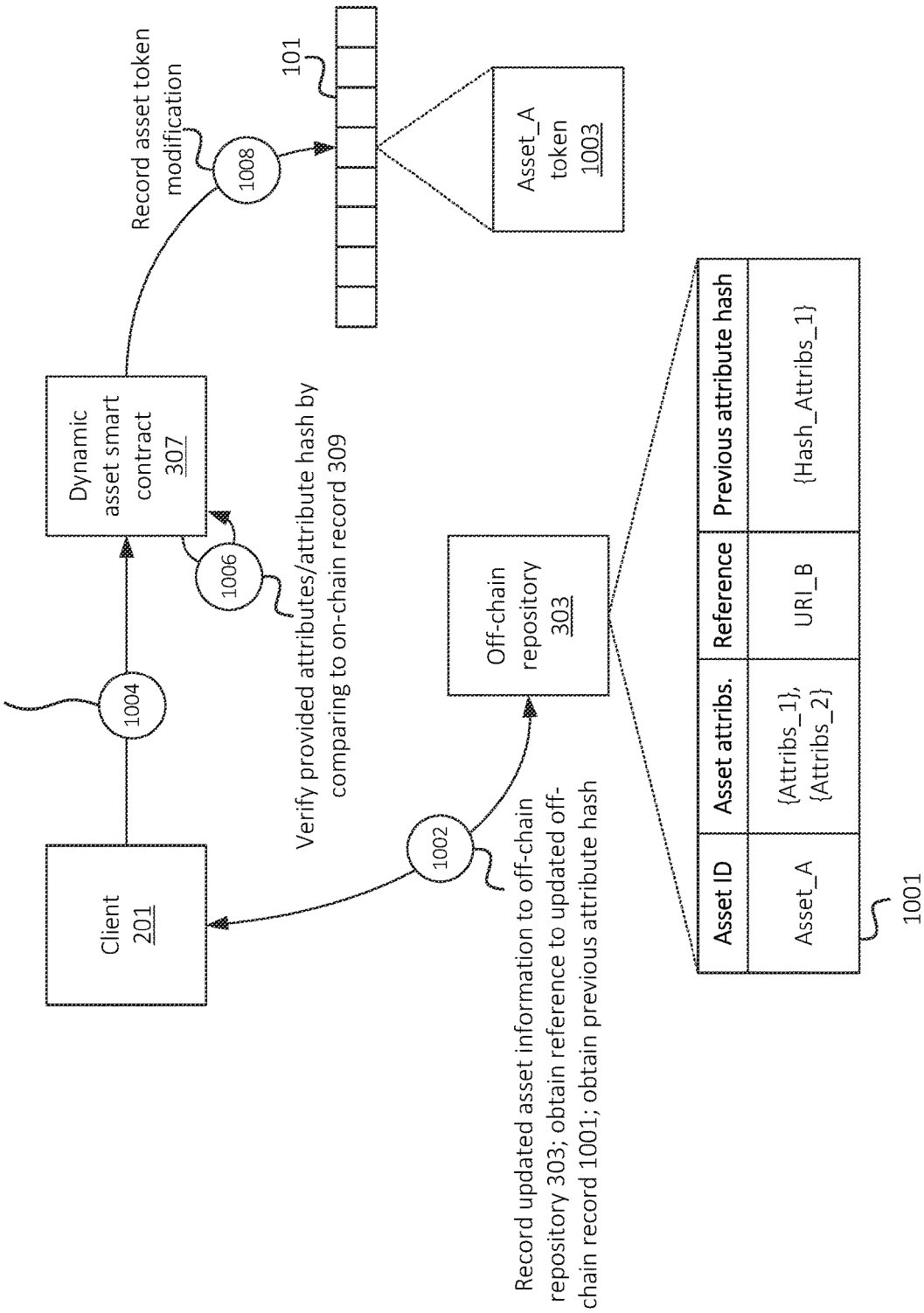
FIG. 10 illustrates an example of recording a modification to a dynamic asset token, in accordance with some embodiments.

FIG. 13 illustrates an example set of records that may be maintained by distributed ledger 101 based on the same updates referred to in the examples of FIGS. 12A-12D, as well as operations described above (e.g., with respect to FIGS. 10, 11A, and 11B). For example, a first record (e.g., "Record_1") may be associated with a creation of the asset token on distributed ledger 101, a second record (e.g., "Record_2") may be associated with a first update to the asset token on distributed ledger 101, a third record ("e.g., Record_3") may be associated with a second update to the asset token on distributed ledger 101, and so on. As discussed above, an "update" to the asset token on distributed ledger 101 may include recording a new instance of the asset token on distributed ledger 101, where client 201, a world state, or other suitable entity, device, or system is able to identify that the latest instance of the asset token is the current, up-to-date version of the asset token (e.g., represents the underlying asset with a current set of attributes), whereas other instances of the asset token are historical or outdated versions of the asset token (e.g., representing the underlying asset in a previous state or with a previous set of attributes).

Figure 14:
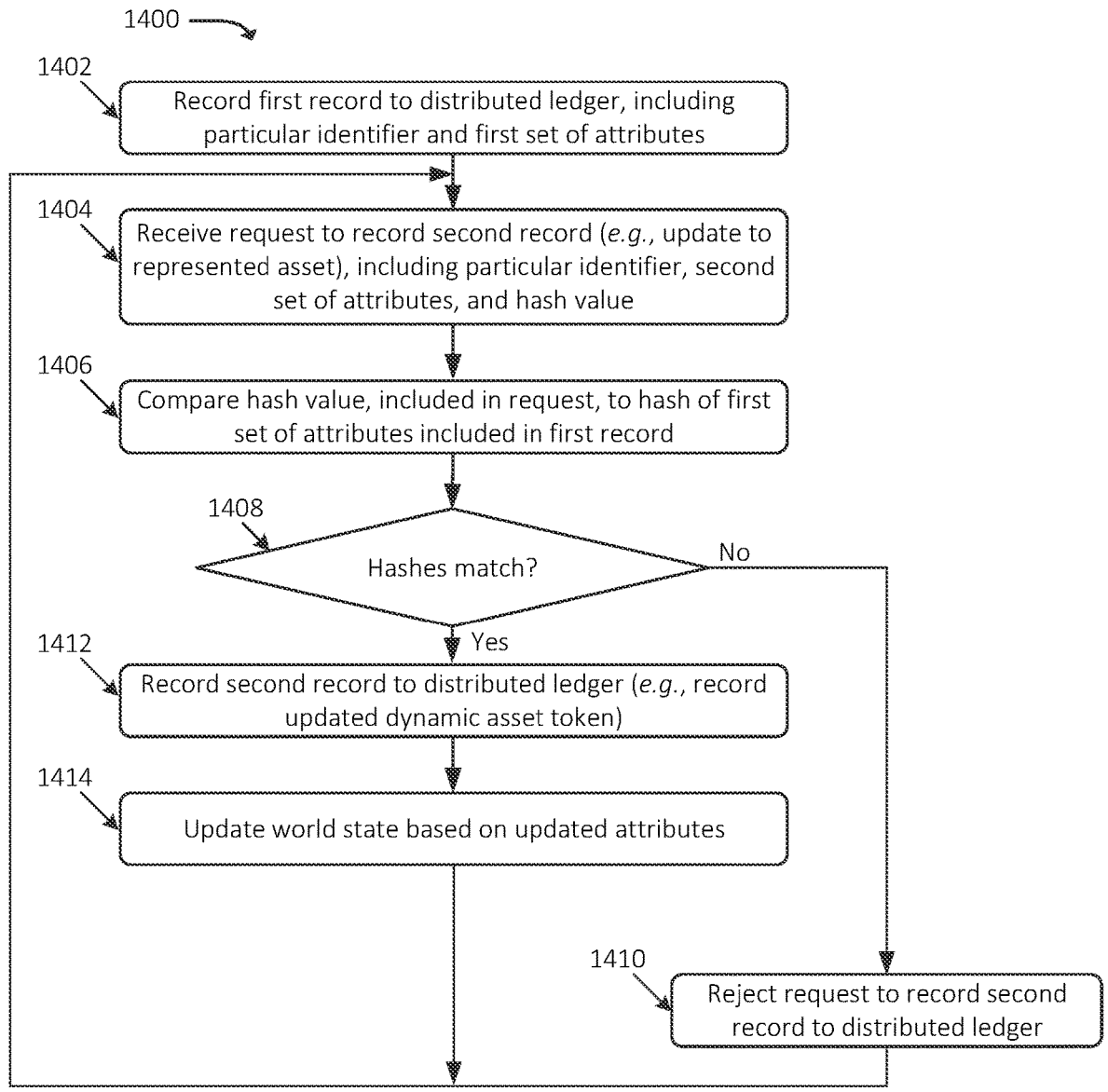
FIG. 14 illustrates an example process for maintaining a dynamic asset token on a distributed ledger, in accordance with some embodiments.

FIG. 14 illustrates an example process 1400 for maintaining a dynamic asset token on a distributed ledger (e.g., distributed ledger 101). In some embodiments, some or all of process 1400 may be performed by one or more nodes 103 that maintain distributed ledger 101. For example, the one or more nodes 103 may execute one or more smart contracts (e.g., DTSC 307), chaincode, etc., to perform some or all of the operations of process 1400. FIG. 14 is described in the context of being performed by "a" particular node 103. In practice, multiple nodes 103 may perform some or all of these operations, and/or a given node 103 may participate in one or more consensus mechanisms or other suitable distributed ledger-related operations (e.g., as discussed above with respect to FIGS. 1, 2A, and/or 2B) to maintain distributed ledger 101, including the recordation of new records to distributed ledger 101.

As shown, process 1400 may include recording (at 1402) a first record to distributed ledger 101, including a particular identifier and a first set of attributes. The first record may be, for example, a dynamic asset token, and the particular identifier may refer to or otherwise be associated with a particular asset (e.g., a tangible asset, a digital asset, etc.). In some embodiments, as discussed above, the first record may include the first set of attributes, and/or may include a link or reference to the first set of attributes (e.g., a URL, URI, etc.). In some embodiments, the first record may include a value computed based on the first set of attributes, such as a hash value or some other value generated as an output of one or more functions or operations where the first set of attributes are an input. In some embodiments, node 103 may update world state information 205 associated with distributed ledger 101 to reflect that the asset (e.g., the particular identifier) is associated with the first set of attributes.

Process 1400 may further include receiving (at 1404) a request to record a second record to the distributed ledger. The second record may be based on, for example, an update to the asset represented by the first record (e.g., by the dynamic asset token). The request may include the particular identifier, a second set of attributes (e.g., an updated set of attributes), and a hash value. The hash value, included in the second record, may have been generated by client 201 and/or other suitable entity issuing the request. In some embodiments, the hash value may have been generated based on information included in off-chain repository 303, where off-chain repository 303 maintains attribute information associated with the asset. The hash value may be generated based on, for example, a previous set of attributes (e.g., previous in relation to the second set of attributes indicated in the request). In some embodiments, prior to issuing the request, client 201 (and/or other suitable device or system issuing the request) may have verified that the hash value matches a hash of the first set of attributes of the first record.

Process 1400 may additionally include comparing (at 1406) the hash value, included in the request, to a hash of the first set of attributes included in the first record of distributed ledger 101. For example, node 103 may identify that the first record is associated with the same particular identifier as included in the request. Node 103 may further identify that the first record is a latest record (e.g., a valid record, a most recently recorded record, etc.), in distributed ledger 101, that is associated with the particular identifier. In some embodiments, node 103 may identify a hash value that is included in the first record. In instances where the first record does not include a hash value, node 103 may generate a hash value based on the first attributes included in the first record.

Process 1400 may also include determining (at 1408) whether the hashes match (e.g., the hash value included in the request as well as the hash value included in or generated based on the attributes included in the first record). If the hashes do not match (at 1408—NO), then process 1400 may include rejecting (at 1410) the request to record the second record to distributed ledger 101. For example, node 103 may forgo recording the second record to distributed ledger 101, may output an error or rejection message indicating that the request was not fulfilled, may indicate a mismatch between the hashes, etc.

If, on the other hand, the hashes match (at 1408—YES), then process 1400 may further include recording (at 1412) the second record to distributed ledger 101. As discussed above, the second record may include the particular identifier, as well as the second attributes. In some embodiments, the second record may include a hash value generated based on the second attributes.

Process 1400 may additionally include updating (at 1414) world state information 205 based on the updated attributes. For example, world state information 205, associated with the particular asset (e.g., the particular identifier) may be updated to reflect the second set of attributes that were recorded to distributed ledger 101.

Figure 15:
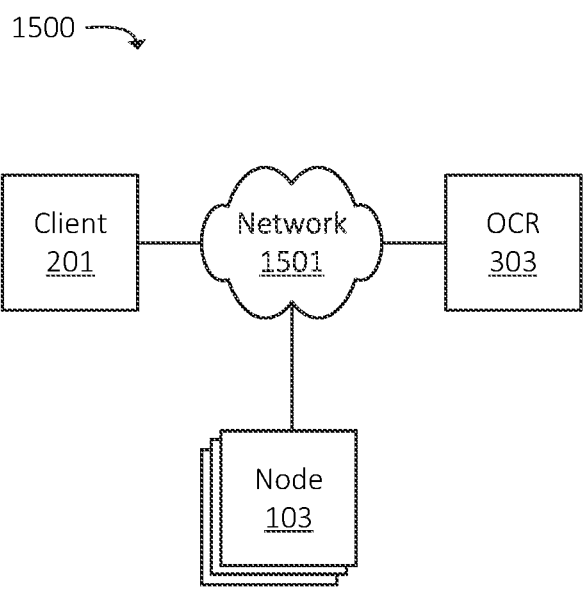
FIG. 15 illustrates an example environment in which one or more embodiments, described herein, may be implemented.

FIG. 15 illustrates an example environment 1500, in which one or more embodiments may be implemented. Environment 1500 may include network 1501, client 201, off-chain repository 303, and one or more nodes 103. In some embodiments, environment 1500 may include one or more additional devices or systems communicatively coupled to network 1501 and/or one or more other networks.

The quantity of devices and/or networks, illustrated in FIG. 15, is provided for explanatory purposes only. In practice, environment 1500 may include additional devices and/or networks, fewer devices and/or networks, different devices and/or networks, or differently arranged devices and/or networks than illustrated in FIG. 15. For example, while not shown, environment 1500 may include devices that facilitate or enable communication between various components shown in environment 1500, such as routers, modems, gateways, switches, hubs, etc. In some implementations, one or more devices of environment 1500 may be physically integrated in, and/or may be physically attached to, one or more other devices of environment 1500. Alternatively, or additionally, one or more of the devices of environment 1500 may perform one or more network functions described as being performed by another one or more of the devices of environment 1500. Elements of environment 1500 may interconnect with each other and/or other devices via wired connections, wireless connections, or a combination of wired and wireless connections. Some or all of the elements of environment 1500 may be implemented by one or more devices, sets of hardware resources, cloud systems, or the like.

Network 1501 may include one or more wired and/or wireless networks. For example, network 1501 may include an Internet Protocol ("IP")-based Packet Data Network ("PDN"), a wide area network ("WAN") such as the Internet, a private enterprise network, and/or one or more other networks. Client 201, off-chain repository 303, nodes 103, and/or other devices or systems may communicate, through network 1501, with data servers, other UEs 1503, and/or to other servers or applications that are coupled to network 1501. Network 1501 may be connected to one or more other networks, such as a public switched telephone network ("PSTN"), a public land mobile network ("PLMN"), and/or another network. Network 1501 may be connected to one or more devices, such as content providers, applications, web servers, and/or other devices, with which client 201, off-chain repository 303, nodes 103, and/or other devices or systems may communicate.

Client 201, off-chain repository 303, nodes 103, and/or other devices or systems may be implemented by one or more cloud systems, server devices, or other types of hardware resources. In some embodiments, client 201, off-chain repository 303, and/or one or more nodes 103 may be implemented by or communicatively coupled to a User Equipment ("UE"), which may include a computation and communication device, such as a wireless mobile communication device that is capable of communicating with network 1501. The UE may communicate with network 1501 via a wired or a wireless interface, such as via one or more radio access network ("RANs"), such as a Fifth Generation ("5G") RAN, a Long-Term Evolution ("LTE") RAN, etc. The UE may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), a Fixed Wireless Access ("FWA") device, or another type of mobile computation and communication device.

Figure 16:
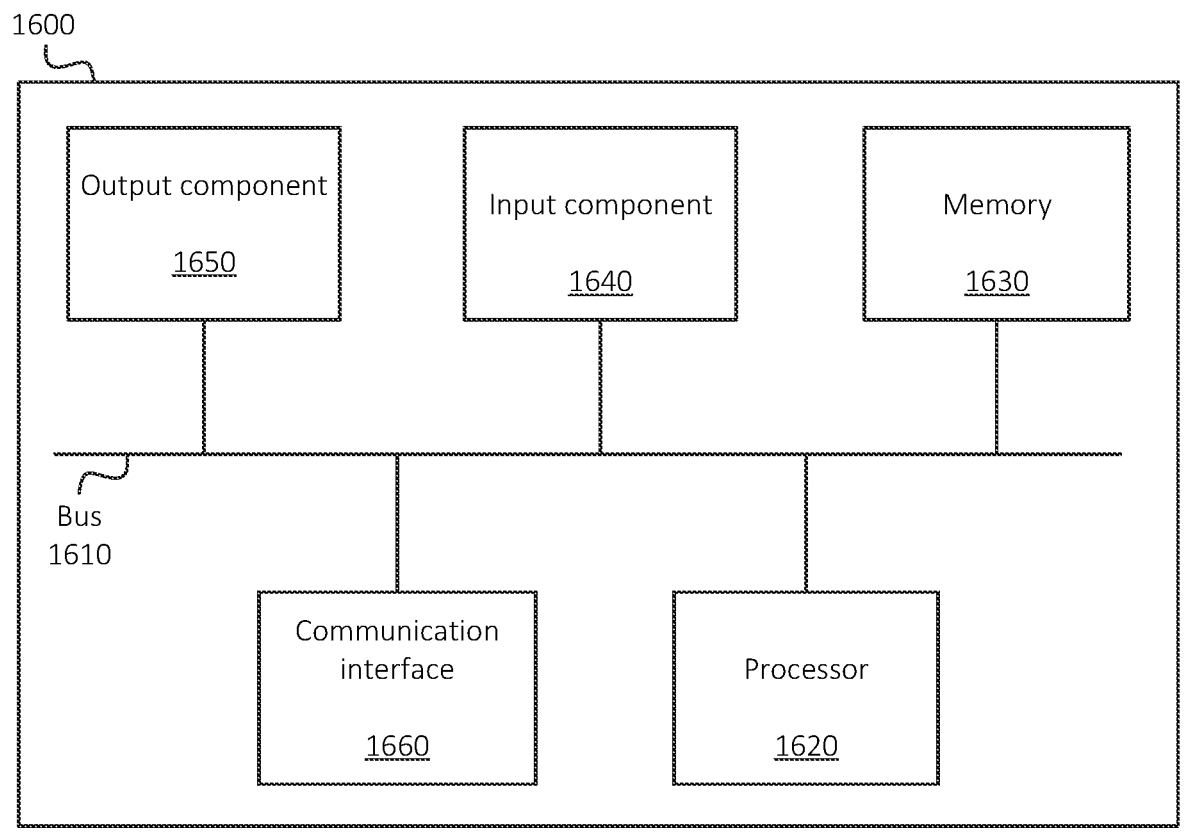
FIG. 16 illustrates example components of one or more devices, in accordance with one or more embodiments described herein.

FIG. 16 illustrates example components of device 1600. One or more of the devices described above may include one or more devices 1600. Device 1600 may include bus 1610, processor 1620, memory 1630, input component 1640, output component 1650, and communication interface 1660. In another implementation, device 1600 may include additional, fewer, different, or differently arranged components.

Bus 1610 may include one or more communication paths that permit communication among the components of device 1600. Processor 1620 may include a processor, microprocessor, or processing logic that may interpret and execute instructions (e.g., processor-executable instructions). In some embodiments, processor 1620 may be or may include one or more hardware processors. Memory 1630 may include any type of dynamic storage device that may store information and instructions for execution by processor 1620, and/or any type of non-volatile storage device that may store information for use by processor 1620.

Input component 1640 may include a mechanism that permits an operator to input information to device 1600 and/or other receives or detects input from a source external to input component 1640, such as a touchpad, a touchscreen, a keyboard, a keypad, a button, a switch, a microphone or other audio input component, etc. In some embodiments, input component 1640 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1650 may include a mechanism that outputs information to the operator, such as a display, a speaker, one or more light emitting diodes ("LEDs"), etc.

Communication interface 1660 may include any transceiver-like mechanism that enables device 1600 to communicate with other devices and/or systems. For example, communication interface 1660 may include an Ethernet interface, an optical interface, a coaxial interface, or the like. Communication interface 1660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1600 may include more than one communication interface 1660. For instance, device 1600 may include an optical interface and an Ethernet interface.

Device 1600 may perform certain operations relating to one or more processes described above. Device 1600 may perform these operations in response to processor 1620 executing instructions, such as software instructions, processor-executable instructions, etc. stored in a computer-readable medium, such as memory 1630. A computer-readable medium may be defined as a non-transitory memory device. A memory device may include space within a single physical memory device or spread across multiple physical memory devices. The instructions may be read into memory 1630 from another computer-readable medium or from another device. The instructions stored in memory 1630 may be processor-executable instructions that cause processor 1620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-13), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
    maintain a distributed ledger that is associated with a plurality of nodes;
    record a first record to the distributed ledger, wherein the first record includes:
        a particular identifier, and
        a first value that is generated based on a first set of attributes that is stored in an off-chain repository that is separate from the distributed ledger;
    receive a request to record a second record to the distributed ledger, wherein the request includes:
        the particular identifier,
        a second set of attributes, and
        a second value;
    identify that the request includes the particular identifier included in the first record;
    determine, based on identifying that the request includes the particular identifier included in the first record, whether the first value, included in the first record, matches the second value included in the request;
    when determining that the first value matches the second value:
        generate a third value based on the second set of attributes;
        record the second record to the distributed ledger, including the particular identifier and the third value generated based on the second set of attributes; and
        provide, to the off-chain repository, the second set of attributes and the particular identifier, wherein the off-chain repository stores information associating the second set of attributes and the particular identifier; and
    when determining that the first value does not match the second value, forgo recording the second record to the distributed ledger.

2. The device of claim 1, wherein the request is a first request, wherein the one or more processors are further configured to:
    receive a second request to record a third record to the distributed ledger, wherein the second request includes:
        the particular identifier,
        a third set of attributes, and
        a fourth value;
    identify that the first and second records are associated with the same particular identifier;
    determine that the second record has been recorded to the distributed ledger after the first record;
    select the second record, from the first and second records, based on determining that the second record has been recorded to the distributed ledger after the first record;
    identify a fifth value that is based on the second set of attributes associated with the second record;
    determine whether the fifth value matches the fourth value; and
    when determining that the fifth value matches the fourth value, record the third record to the distributed ledger, including the particular identifier and the third set of attributes.

3. The device of claim 1, wherein the first and second records are associated with one or more non-fungible tokens ("NFTs").

4. The device of claim 1, wherein the first value is generated by performing a hashing operation on the first set of attributes.

5. The device of claim 4, wherein the hashing operation is performed on the first set of attributes as maintained by the off-chain repository.

6. The device of claim 1, wherein the second value is included in the first record.

7. The device of claim 1, wherein the one or more processors are further configured to:
generate the second value based on the first set of attributes included in the first record after receiving the request that includes the same particular identifier as included in the first record.

8. A non-transitory computer-readable medium, storing a plurality of processor-executable instructions to:
maintain a distributed ledger that is associated with a plurality of nodes;
record a first record to the distributed ledger, wherein the first record includes:
a particular identifier, and
a first value that is generated based on a first set of attributes that is stored in an off-chain repository that is separate from the distributed ledger;
receive a request to record a second record to the distributed ledger, wherein the request includes:
the particular identifier,
a second set of attributes, and
a second value;
identify that the request includes the particular identifier included in the first record;
determine, based on identifying that the request includes the particular identifier included in the first record, whether the first value, included in the first record, matches the second value included in the request;
when determining that the first value matches the second value:
generate a third value based on the second set of attributes;
record the second record to the distributed ledger, including the particular identifier and the third value generated based on the second set of attributes; and
provide, to the off-chain repository, the second set of attributes and the particular identifier, wherein the off-chain repository stores information associating the second set of attributes and the particular identifier; and
when determining that the first value does not match the second value, forgo recording the second record to the distributed ledger.

9. The non-transitory computer-readable medium of claim 8, wherein the request is a first request, wherein the plurality of processor-executable instructions further include processor-executable instructions to:
receive a second request to record a third record to the distributed ledger, wherein the second request includes:
the particular identifier,
a third set of attributes, and
a fourth value;
identify that the first and second records are associated with the same particular identifier;
determine that the second record has been recorded to the distributed ledger after the first record;
select the second record, from the first and second records, based on determining that the second record has been recorded to the distributed ledger after the first record;
identify a fifth value that is based on the second set of attributes associated with the second record;
determine whether the fifth value matches the fourth value; and
when determining that the fifth value matches the fourth value, record the third record to the distributed ledger, including the particular identifier and the third set of attributes.

10. The non-transitory computer-readable medium of claim 8, wherein the first and second records are associated with one or more non-fungible tokens ("NFTs").

11. The non-transitory computer-readable medium of claim 8, wherein the first value is generated by performing a hashing operation on the first set of attributes.

12. The non-transitory computer-readable medium of claim 11, wherein the hashing operation is performed on the first set of attributes as maintained by the off-chain repository.

13. The non-transitory computer-readable medium of claim 8, wherein the second value is included in the first record.

14. The non-transitory computer-readable medium of claim 8, wherein the plurality of processor-executable instructions further include processor-executable instructions to:
generate the second value based on the first set of attributes included in the first record after receiving the request that includes the same particular identifier as included in the first record.

15. A method, comprising:
maintaining a distributed ledger that is associated with a plurality of nodes;
recording a first record to the distributed ledger, wherein the first record includes:
a particular identifier, and
a first value that is generated based on a first set of attributes that is stored in an off-chain repository that is separate from the distributed ledger;
receiving a request to record a second record to the distributed ledger, wherein the request includes:
the particular identifier,
a second set of attributes, and
a second value;
identifying that the request includes the particular identifier included in the first record;
determining, based on identifying that the request includes the particular identifier included in the first record, whether the first value, included in the first record, matches the second value included in the request;
when determining that the first value matches the second value:
generating a third value based on the second set of attributes;
recording the second record to the distributed ledger, including the particular identifier and the third value generated based on the second set of attributes; and
providing, to the off-chain repository, the second set of attributes and the particular identifier, wherein the off-chain repository stores information associating the second set of attributes and the particular identifier; and
when determining that the first value does not match the second value, forgoing recording the second record to the distributed ledger.

16. The method of claim 15, wherein the request is a first request, the method further comprising:
- receiving a second request to record a third record to the distributed ledger, wherein the second request includes:
  - the particular identifier,
  - a third set of attributes, and
  - a fourth value;
- identifying that the first and second records are associated with the same particular identifier;
- determining that the second record has been recorded to the distributed ledger after the first record;
- selecting the second record, from the first and second records, based on determining that the second record has been recorded to the distributed ledger after the first record;
- identifying a fifth value that is based on the second set of attributes associated with the second record;
- determining whether the fifth value matches the fourth value; and
- when determining that the fifth value matches the fourth value, recording the third record to the distributed ledger, including the particular identifier and the third set of attributes.

17. The method of claim 15, wherein the first and second records are associated with one or more non-fungible tokens ("NFTs").

18. The method of claim 15, wherein the first value is generated by performing a hashing operation on the first set of attributes, wherein the hashing operation is performed on the first set of attributes as maintained by an off-chain repository that is external to the nodes that maintain the distributed ledger.

19. The method of claim 15, wherein the second value is included in the first record.

20. The method of claim 15, the method further comprising:
- generating the second value based on the first set of attributes included in the first record after receiving the request that includes the same particular identifier as included in the first record.

* * * * *